United States Patent
Cruickshank et al.

(10) Patent No.: US 9,711,835 B2
(45) Date of Patent: Jul. 18, 2017

(54) APPARATUS AND METHODS RELATED TO JUNCTION FERRITE DEVICES HAVING IMPROVED INSERTION LOSS PERFORMANCE

(71) Applicant: Skyworks Solutions, Inc., Woburn, MA (US)

(72) Inventors: David Bowie Cruickshank, Rockville, MD (US); Iain Alexander Macfarlane, Midleton (IE)

(73) Assignee: Skyworks Solutions, Inc., Woburn, MA (US)

( * ) Notice: Subject to any disclaimer, the term of this patent is extended or adjusted under 35 U.S.C. 154(b) by 299 days.

(21) Appl. No.: 13/896,021

(22) Filed: May 16, 2013

(65) Prior Publication Data

US 2013/0321090 A1 Dec. 5, 2013

Related U.S. Application Data

(60) Provisional application No. 61/648,880, filed on May 18, 2012.

(51) Int. Cl.
 *H01P 1/387* (2006.01)
 *H01P 1/383* (2006.01)
 *C01G 23/00* (2006.01)

(52) U.S. Cl.
 CPC ............ *H01P 1/383* (2013.01); *C01G 23/003* (2013.01); *H01P 1/387* (2013.01)

(58) Field of Classification Search
 CPC ....................................................... H01P 1/32
 (Continued)

(56) References Cited

U.S. PATENT DOCUMENTS

| 4,122,418 A | 10/1978 | Nagao |
| 4,390,853 A | 6/1983 | Mathew et al. |

(Continued)

FOREIGN PATENT DOCUMENTS

| CN | 1661850 A | 8/2005 |
| CN | 201063356 Y | 5/2008 |

(Continued)

OTHER PUBLICATIONS

International Search Report and Written Opinion of the International Search Authority in PCT/US2013/041442, 14 pages, mailed on Dec. 4, 2013.

(Continued)

*Primary Examiner* — Stephen E Jones
(74) *Attorney, Agent, or Firm* — Knobbe, Martens, Olson & Bear LLP

(57) ABSTRACT

Disclosed are apparatus and methods related to junction ferrite devices having improved insertion loss performance. In some implementations, a ferrite disk assembly can be configured for a radio-frequency (RF) circulator. The disk assembly can include a ferrite-based disk having a ferrite portion and a metalized layer formed on a grounding surface of the disk to improve electrical contact between the grounding surface of the disk with an external grounding surface. The ferrite-based disk can further include a dielectric portion disposed around the periphery of the ferrite center portion. In some embodiments, the metalized layer can be a silver layer formed on the grounding surface of the disk and having a desired thickness.

22 Claims, 16 Drawing Sheets

(58) Field of Classification Search
USPC .................................................. 333/1.1, 24.2
See application file for complete search history.

(56) References Cited

U.S. PATENT DOCUMENTS

| | | | |
|---|---|---|---|
| 4,457,464 A | | 7/1984 | Forterre et al. |
| 4,496,915 A | | 1/1985 | Mathew et al. |
| 4,797,992 A | * | 1/1989 | Powers .................. H01P 1/387 |
| | | | 156/89.12 |
| 5,495,210 A | | 2/1996 | Forterre et al. |
| 6,313,713 B1 | | 11/2001 | Ho et al. |
| 6,507,249 B1 | | 1/2003 | Schloemann |
| 6,917,250 B2 | | 7/2005 | Lombardi et al. |
| 6,933,799 B1 | | 8/2005 | Nukaga et al. |
| 7,242,264 B1 | * | 7/2007 | How ...................... H01P 1/362 |
| | | | 333/1.1 |
| 7,683,731 B2 | | 3/2010 | Kroening |
| 9,214,712 B2 | | 12/2015 | Cruickshank et al. |
| 2006/0139118 A1 | * | 6/2006 | Vaughn .................. H01P 1/387 |
| | | | 333/1.1 |
| 2009/0002090 A1 | | 1/2009 | Pietig et al. |
| 2009/0206943 A1 | * | 8/2009 | Kawanami ............. H01P 1/387 |
| | | | 333/1.1 |
| 2010/0102902 A1 | * | 4/2010 | Jung ...................... H01P 1/2053 |
| | | | 333/212 |
| 2010/0109791 A1 | | 5/2010 | Lingel |
| 2010/0127792 A1 | | 5/2010 | Wada et al. |
| 2011/0193649 A1 | | 8/2011 | Popelka et al. |

FOREIGN PATENT DOCUMENTS

| | | |
|---|---|---|
| CN | 201490314 U | 5/2010 |
| CN | 201708237 U | 1/2011 |
| CN | 102187514 A | 9/2011 |
| CN | 102569964 A | 7/2012 |
| EP | 1 083 153 A1 | 3/2001 |
| GB | 2320369 | 6/1998 |
| JP | 09-167903 | 6/1997 |
| KR | 10-2006-0085221 | 7/2006 |
| KR | 10-1007544 | 1/2011 |
| KR | 101 007 544 B1 | 1/2011 |
| WO | WO 2009/120667 A2 | 10/2009 |
| WO | WO 2012/154607 | 11/2012 |

OTHER PUBLICATIONS

European Patent Office, Extended European Search Report, mailed on Dec. 18, 2015 in European Application No. 13791473.5.

* cited by examiner

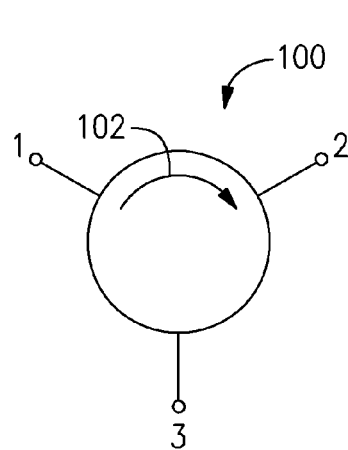
FIG.1A
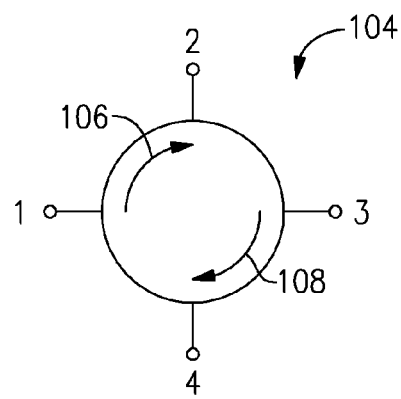
FIG.1B
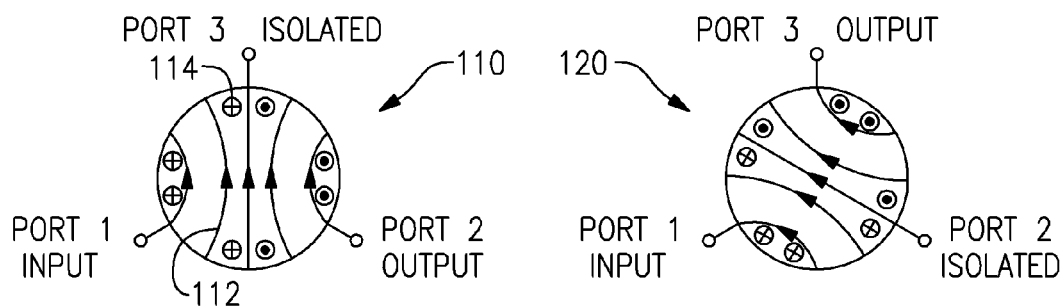
FIG.2A
FIG.2B
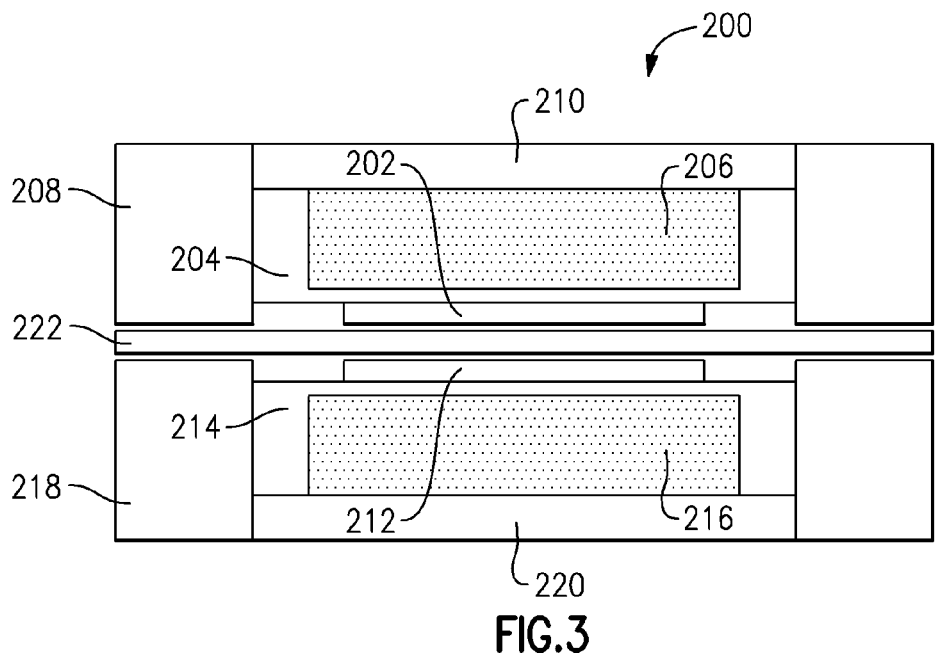
FIG.3

| | X | Y | Y | X+Y+Z | Al$_2$O$_3$ (% BY WT.) |
|---|---|---|---|---|---|
| 1112 → | 0<X<1 | 0<Y<1 | 0<Z<1 | X+Y+Z≤1 | 0–50 |
| 1114 → | 0<X<2 | 0<Y≤1 | 0<Z<0.03 | 1<X+Y+Z<2 | 0–50 |
| 1116 → | 0<X<2 | 0<Y≤1 | 0.09<Z≤1 | 1<X+Y+Z<2 | 0–50 |

FIG.28

| | X | Y | Z | X+Y+Z | Al₂O₃ | $\varepsilon'$ | $\tau_f$ | QxF | SINTERING TEMPERATURE °C |
|---|---|---|---|---|---|---|---|---|---|
| 1204a | 0.922 | 0.071 | 0.007 | 1.000 | 0 | 20.53 | 12.89 | 15567 | 1265 |
| 1204b | 0.675 | 0.052 | 0.273 | 1.000 | 0 | 21.01 | -32.41 | 45777 | 1240 |
| 1204c | 0.846 | 0.065 | 0.116 | 1.027 | 0 | 21.18 | 4.92 | 48939 | 1275 |
| 1204d | 0.591 | 0.074 | 0.335 | 1.000 | 0 | 23.54 | 7.49 | 31438 | 1200 |
| 1204e | 0.928 | 0.071 | 0.447 | 1.447 | 0 | 19.43 | 0 | 41162 | 1275 |
| 1204f | 0.928 | 0.071 | 0.149 | 1.149 | 5 | 20.39 | 2.71 | 55944 | 1275 |
| 1204g | 0.928 | 0.071 | 0.894 | 1.894 | 37.5 | 14.36 | -2.72 | 15202 | 1275 |
| 1204h | 1.485 | 0.130 | 0.127 | 1.743 | 0 | 20.64 | 69.8 | 32819 | 1355 |
| 1204i | 0.436 | 0.034 | 0.530 | 1.000 | 0 | 25.53 | -44.05 | 25971 | 1220 |
| 1204j | 0.839 | 0.071 | 0.089 | 1.000 | 5 | 20.21 | -5.5 | 49198 | 1275 |
| 1204k | 0.839 | 0.071 | 0.089 | 1.000 | 5 | 20.71 | -5.07 | 61114 | 1290 |
| 1204l | 0.839 | 0.071 | 0.089 | 1.000 | 5 | 20.32 | -6.37 | 50879 | 1360 |
| 1204m | 0.329 | 0.061 | 0.610 | 1.000 | 1% CuO | 23.16 | -0.97 | 24035 | 1100 |
| 1204n | 0.329 | 0.061 | 0.610 | 1.000 | 1% B₂O₃ | 21.42 | -27 | 15230 | 1000 |

FIG.29

APPARATUS AND METHODS RELATED TO JUNCTION FERRITE DEVICES HAVING IMPROVED INSERTION LOSS PERFORMANCE

CROSS-REFERENCE TO RELATED APPLICATIONS

This application claims priority to U.S. Provisional Application No. 61/648,880 filed May 18, 2012 and entitled "APPARATUS AND METHODS RELATED TO JUNCTION FERRITE DEVICES HAVING IMPROVED INSERTION LOSS PERFORMANCE," which is expressly incorporated by reference herein in its entirety.

BACKGROUND

Field

The present disclosure generally relates to apparatus and methods related to junction ferrite devices having improved insertion loss performance in radio-frequency (RF) applications.

Description of the Related Art

In radio-frequency (RF) applications, junction ferrite devices such as circulators can be utilized to, for example, selectively route RF signals between an antenna, a transmitter, and a receiver. If an RF signal is being routed between the transmitter and the antenna, the receiver preferably should be isolated. Accordingly, a circulator is sometimes also referred to as an isolator; and such an isolating performance can represent the performance of the circulator.

SUMMARY

In some implementations, the present disclosure relates to a circulator that includes a grounding plane having a first and a second side. The circulator further includes a magnet disposed on the first side of the grounding plane. The circulator further includes a ferrite-based disk disposed on the second side of the grounding plane. The ferrite-based disk includes a metalized layer on a grounding surface such that the metalized layer is in electrical contact with the second side of the grounding plane.

In some embodiments, the ferrite-based disk can have a circular shape. The ferrite-based disk can include a circular shaped ferrite disk surrounded by a dielectric ring. The ferrite disk and the dielectric ring can be secured to each other substantially free of glue. The ferrite disk and the dielectric ring can be formed by co-firing an assembly that includes a pre-sintered ferrite rod and an un-sintered dielectric cylinder fit around the ferrite rod.

In some embodiments, the metalized layer can have a thickness that is at least 0.5 times a skin depth for a selected frequency range. In some embodiments, the thickness can be at least 1.0 times the skin depth. In some embodiments, the thickness can be at least 2.0 times the skin depth.

In some embodiments, the grounding surface can have a finish so that an average value of feature sizes on the grounding surface is less than or equal to approximately 1.0 micron. In some embodiments, the average value of feature sizes on the grounding surface can be less than or equal to approximately 0.5 micron. In some embodiments, the average value of feature sizes on the grounding surface can be less than or equal to approximately 0.2 micron.

In some embodiments, the metalized layer can include a silver layer. In some embodiments, the circulator can further include a center conductor disposed on the side opposite from the grounding side of the ferrite-based disk. The circulator can further include a second ferrite-based disk, a second magnet, and a second grounding plane configured substantially similar to and arranged as mirror images of the ferrite-based disk, the magnet, and the grounding plane about the center conductor.

In accordance with a number of implementations, the present disclosure relates to a method for fabricating a circulator. The method includes providing a grounding plane having a first side and a second side. The method further includes positioning a magnet on the first side of the grounding plane. The method further includes positioning a ferrite-based disk on the second side of the grounding plane. The ferrite-based disk includes a metalized layer on a grounding surface such that the metalized layer is in electrical contact with the second side of the grounding plane.

According to some implementations, the present disclosure relates to a ferrite disk assembly for a radio-frequency (RF) circulator. The disk assembly includes a ferrite-based disk that includes a ferrite center portion. The disk assembly further includes a metalized layer formed on a first surface of the disk to improve electrical contact between the first surface of the disk with an external contact surface.

In some embodiments, the first surface of the disk can include a grounding surface, such that the metalized layer improves the electrical contact between the grounding surface of the disk and an external grounding surface. In some embodiments, the ferrite-based disk can further include a dielectric portion disposed around the periphery of the ferrite center portion. The ferrite center portion can have a circular shape, and the dielectric portion can have a circular ring shape.

In a number of implementations, the present disclosure relates to a method for fabricating a ferrite disk assembly for a radio-frequency (RF) circulator. The method includes forming a ferrite-based disk that includes a ferrite center portion. The method further includes forming a metalized layer on a first surface of the disk to improve electrical contact between the first surface of the disk with an external contact surface.

In some implementations, the method can further include forming a desired finish surface on the first surface of the disk prior to the metalized layer formation. The forming of the metalized layer can include depositing a film of metal using an ink deposition method. The method can further include curing the deposited film of metal.

According to some teachings, the present disclosure relates to a method for improving insertion loss performance of a radio-frequency (RF) circulator. The method includes forming a ferrite-based disk that includes a ferrite center portion. The method further includes forming a desired finish for a grounding surface on the disk. The finish is selected to improve an electrical connection between the grounding surface and one or more metal structures. The desired finish includes an average feature size on the grounding surface that is less than an average size resulting from a cut that yields the ferrite-based disk.

In some implementations, the one or more metal structures can include a metalized layer formed on the grounding surface.

In accordance with some implementations, the present disclosure relates to a packaged circulator module. The module includes a mounting platform configured to receive one or more components thereon. The module further includes a circulator device mounted on the mounting platform. The circulator device includes a grounding plane having first and second sides, and a magnet disposed on the first side of the grounding plane. The circulator device further includes a ferrite-based disk disposed on the second side of the grounding plane. The ferrite-based disk has a metalized layer on a grounding surface such that the metalized layer is in electrical contact with the second side of the grounding plane. The module further includes a housing mounted on the mounting platform and dimensioned to substantially enclose and protect the circulator device.

In a number of implementations, the present disclosure relates to a radio-frequency (RF) circuit board. The circuit board includes a circuit substrate configured to receive a plurality of components. The circuit board further includes a plurality of circuits disposed on the circuit substrate and configured to process RF signals. The circuit board further includes a circulator device disposed on the circuit substrate and interconnected with at least some of the circuits. The circulator device includes a grounding plane having first and second sides, and a magnet disposed on the first side of the grounding plane. The circulator device further includes a ferrite-based disk disposed on the second side of the grounding plane. The ferrite-based disk has a metalized layer on a grounding surface such that the metalized layer is in electrical contact with the second side of the grounding plane. The circuit board further includes a plurality of connection features configured to facilitate passing of the RF signals to and from the RF circuit board.

In some implementations, the present disclosure relates to a radio-frequency (RF) system. The system includes an antenna assembly configured to facilitate transmission and reception of RF signals. The system further includes a transceiver in communication with the antenna assembly and configured to generate a transmit signal for transmission by the antenna assembly and process a received signal from the antenna assembly. The system further includes a front end module configured to facilitate routing of the transmit signal and the received signal. The front end module includes one or more circulators, with each circulator including a grounding plane having first and second sides, and a magnet disposed on the first side of the grounding plane. The circulator further includes a ferrite-based disk disposed on the second side of the grounding plane. The ferrite-based disk has a metalized layer on a grounding surface such that the metalized layer is in electrical contact with the second side of the grounding plane.

In some embodiments, the system can include a base station. The base station can be a cellular base station.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIGS. 1A and 1B schematically show examples of circulators such as a 3-port circulator and a 4-port circulator.

FIGS. 2A and 2B show examples of how magnetic fields can be applied to route electromagnetic energy between selected ports while isolating a non-selected port of a circulator.

FIG. 3 shows an example configuration of a circulator device having a pair of ferrite disks disposed between a pair of cylindrical magnets.

FIG. 28 shows a table with example compositional range of example dielectric ceramic compositions that can be utilized for the dielectric cylinder of FIG. 23.

FIG. 29 shows a table with example electrical properties and example sintering temperatures of example dielectric ceramic compositions described herein.

DETAILED DESCRIPTION OF SOME EMBODIMENTS

Figure 4:
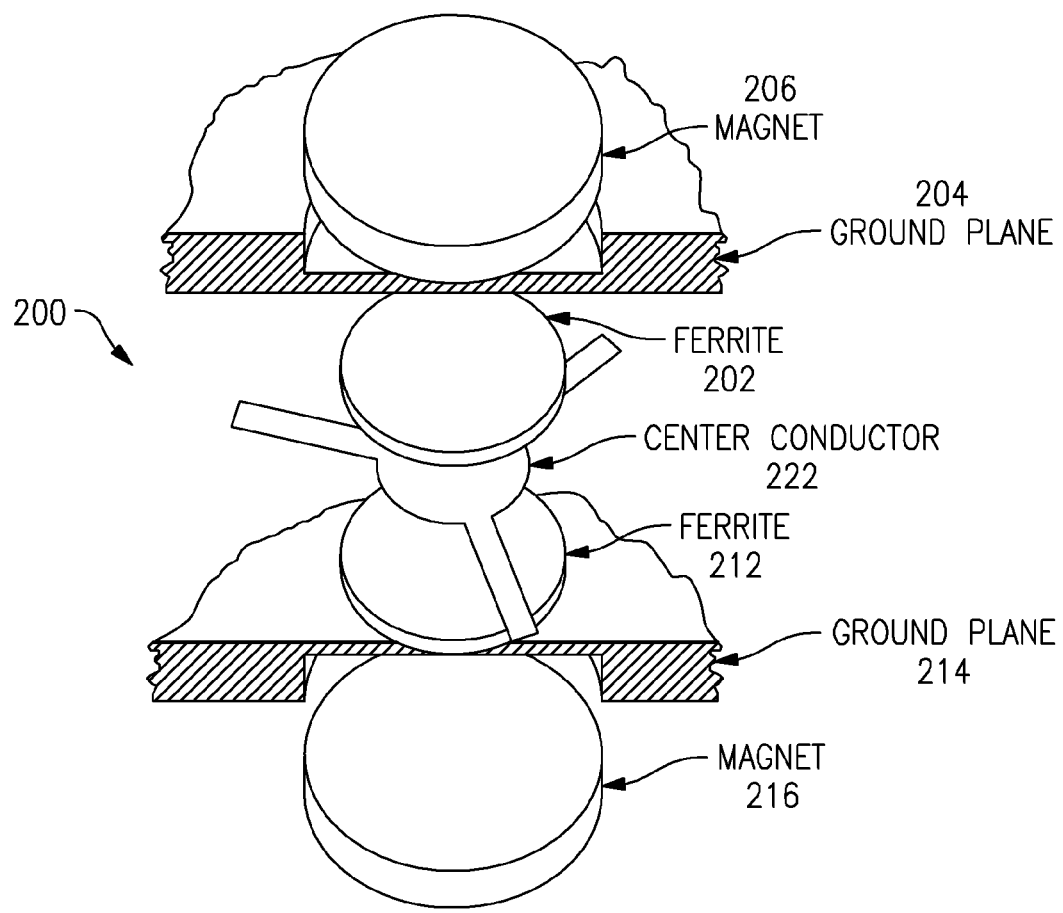
FIG. 4 shows an un-assembled view of a portion of the example circulator device of FIG. 3.

The headings provided herein, if any, are for convenience only and do not necessarily affect the scope or meaning of the claimed invention.

In some implementations, junction ferrite devices such as circulators are passive devices utilized in radio-frequency (RF) applications to, for example, selectively route RF signals between an antenna, a transmitter, and a receiver. If a signal is being routed between the transmitter and the antenna, the receiver preferably should be isolated. Accordingly, a circulator is sometimes also referred to as an isolator; and such an isolating performance can represent the performance of the circulator.

In some embodiments, a circulator can be a passive device having three or more ports (e.g., ports for antenna, transmitter and receiver). FIGS. 1A and 1B schematically show an example of a 3-port circulator 100 and a 4-port circulator 104. In the example 3-port circulator 100, a signal is shown to be routed (arrow 102) from port 1 to port 2; and port 3 can be substantially isolated from such a signal. In the example 4-port circulator 104, a signal is shown to be routed (arrow 106) from port 1 to port 2; and another signal is shown to be routed (arrow 108) from port 3 to port 4. The two junctions of the signal paths in the example of FIG. 1B can be substantially isolated from each other. Other configurations of 3 and 4-port circulators, as well as circulators having other numbers of ports, can also be implemented.

In some implementations, a circulator can be based on ferrite materials. Ferrites are magnetic materials having very high ohmic resistance. Accordingly, ferrites have little or no eddy current when subjected to changing magnetic fields, and are therefore suitable for RF applications.

Ferrites can include Weiss domains, where each domain has a net non-zero magnetization. When there is no external magnetic field influencing a ferrite object, the Weiss domains are oriented substantially randomly, so that the ferrite as a whole has a net magnetization of approximately zero.

If an external magnetic field of sufficient strength is applied to the ferrite object, the Weiss domains tend to align along the direction of the external magnetic field. Such a net magnetization can influence how an electromagnetic wave propagates within the ferrite object.

For example, and as depicted in FIGS. 2A and 2B, suppose that a circular disk shaped ferrite object 110 is subjected to a substantially static external magnetic field directed along the axis (perpendicular to the plane of paper) of the disk. In the absence of such an external field (not shown), an RF signal input into Port 1 and propagating perpendicular to the disk axis splits into two rotating waves with a substantially same propagation speed. One wave rotates clockwise around the disk, and the other counter-clockwise around the disk, so as to yield a standing wave pattern. If Ports 2 and 3 are positioned equally spaced azimuthally relative to Port 1 (about 120 degrees from each other), the standing wave pattern results in approximately half of the incoming wave leaving each of Ports 2 and 3.

In the presence of such an external magnetic field, the propagation speeds of the two rotating waves are no longer the same. Because of the difference in the propagation speeds, the resulting standing wave pattern can yield a situation where substantially all of the energy of the incoming wave is passed to one of the two ports while the other port is substantially isolated.

For example, FIG. 2A shows a configuration where the axial static magnetic field (not shown) yielding a rotated standing wave pattern relative to the incoming wave propagation direction (along Port 1). Examples of electric field lines corresponding to such a standing wave pattern are depicted as 112 (along a plane of the disk) and 114, 116 (along the axis of the disk). The example rotated standing wave pattern results in a substantial null in electric field strength at Port 3, thereby yielding substantial isolation of Port 3. On the other hand, Port 2 is depicted as having a similar (inverted) wave pattern as that of the input at Port 1, and therefore transmits energy from Port 1 to Port 2.

FIG. 2B shows another example where an axial static magnetic field (not shown) yields a rotated standing wave pattern, such that a wave input through Port 1 is passed to Port 3 as an output, and Port 2 is substantially isolated. In some implementations, the two rotated standing wave patterns can be achieved by providing magnetic fields that are higher and lower than a field value that results in a resonance in the precession of ferrite domains.

FIG. 3 shows an example configuration of a circulator device 200 having a pair of ferrite disks 202, 212 disposed between a pair of cylindrical magnets 206, 216. FIG. 4 shows an un-assembled view of a portion of the example circulator device 200.

In the example shown, the first ferrite disk 202 is shown to be mounted to an underside of a first ground plane 204. An upper side of the first ground plane 204 is shown to define a recess dimensioned to receive and hold the first magnet 206. Similarly, the second ferrite disk 212 is shown to be mounted to an upper side of a second ground plane 214; and an underside of the second ground plane 214 is shown to define a recess dimensioned to receive and hold the second magnet 216.

The magnets 206, 216 arranged in the foregoing manner can yield generally axial field lines through the ferrite disks 202, 212. The magnetic field flux that passes through the ferrite disks 202, 212 can complete its circuit through return paths provided by 220, 218, 208 and 210 so as to strengthen the field applied to the ferrite disks 202, 212. In some embodiments, the return path portions 220 and 210 can be disks having a diameter larger than that of the magnets 216, 206; and the return path portions 218 and 208 can be hollow cylinders having an inner diameter that generally matches the diameter of the return path disks 220, 210. The foregoing parts of the return path can be formed as a single piece or be an assembly of a plurality of pieces.

The example circulator device 200 can further include an inner flux conductor (also referred to herein as a center conductor) 222 disposed between the two ferrite disks 202, 212. Such an inner conductor can be configured to function as a resonator and matching networks to the ports (not shown).

In some implementations, the example circulator device 200 can further include a high relative dielectric (Er) material disposed between the edge portion of the ferrite disks 202, 212 and the return path portions 208, 218. Such a high Er dielectric can be formed as a ring dimensioned to fit between the corresponding ferrite disk and the outer return path portion.

In some implementations, such a dielectric ring can be part of a composite ferrite/dielectric TM resonator, where the dielectric replaces some of the ferrite. A high dielectric constant material can be used to keep the diameter of the composite approximately the same as a ferrite-only resonator at a desired frequency. In some embodiments, such a dielectric material can have a dielectric constant value between about 16 and 30, but are not necessarily confined to that range. In some implementations, such a dielectric can provide a non-magnetic gap between the ferrite and the return path magnetic field to thereby improve intermodulation distortion (IMD) reduction performance over a configuration where the ferrite extends further out to the return path.

Figure 5:
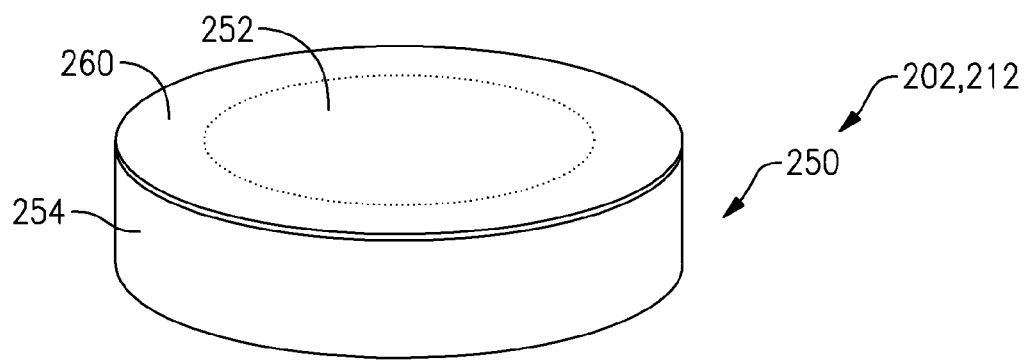
FIG. 5 shows that in some implementations, a ferrite disk or a ferrite/dielectric disk assembly can include a metalized layer formed on a side of the disk that is grounded.

FIG. 5 shows that in some implementations, a ferrite disk or a ferrite/dielectric disk assembly 250 can include a metalized layer 260 formed on a side of the disk 250 that is grounded. As described herein, such a metalized layer on the grounding side of the disk 250 can yield significant improvements in insertion loss performance when compared to a bare disk configuration or a configuration where a highly conductive metal foil is disposed between a ferrite-based disk and the ground plane. Additional details concerning such a metalized layer 260 are described herein in greater detail. In some embodiments, the disk 250 having the metalized layer 260 can be utilized as the ferrite based disks 202, 212 described in reference to FIGS. 3 and 4.

For the purpose of description, a disk can include a ferrite-only disk, or a ferrite-disk and a dielectric ring assembly. In the example shown in FIG. 5, the disk 250 having the metalized layer 260 includes a ferrite disk 252 and a dielectric ring 254. It will be understood that one or more features of the present disclosure can also be implemented in a configuration where a disk is a ferrite-only disk. It will also be understood that one or more features of the present disclosure can also apply to other shaped disks or plates. For example, a triangle-shaped disk can include a metalized side and provide advantages associated with such metallization.

In some implementations, the foregoing metallization of ferrite-based disks can improve insertion loss performance of the circulator. The insertion loss of a ferrite device can include a contribution from the ground plane both in terms of conductivity and conductor path length. In addition, air gaps can exist in configurations where a conductive metal foil is used between a ferrite-based disk and the ground plane. Such air gaps can introduce spurious responses which can appear as small peaks in the insertion loss response, and/or reduce the symmetry in the circulator operation resulting in poorer return loss and isolation. Such undesirable effects associated with air gaps can result in a lower yield of good production circulator devices.

As described herein, the use of a metalized layer formed on a surface of a disk can improve insertion loss performance. In some embodiments, such a metalized layer can include a thick film metallization layer formed from, for example, silver or copper. Such an improvement in insertion loss performance can be due to, for example, elimination of air gaps and improved conductivity provided by the thick film metallization layer. In some embodiments, the use of a polished ferrite/dielectric assembly on the side in contact with the metal forming the ground plane can reduce the effective conductor length. Embodiments using a glued ferrite/dielectric assembly typically have significant additional dielectric loss from the glue; thus, eliminating the glue can improve device insertion loss performance. Examples of the foregoing features are described herein in greater detail.

Figure 6:
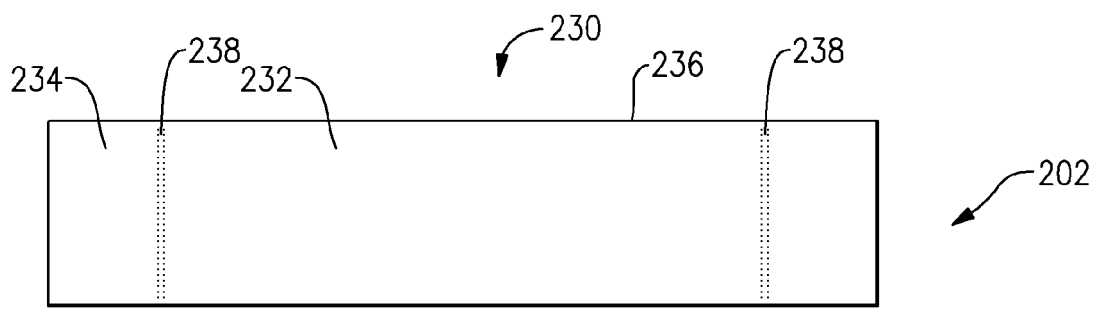
FIG. 6 shows an example of a disk assembly having a ferrite disk and a dielectric ring that can be metalized to form the metalized disk of FIG. 5.

FIG. 6 shows that in some implementations, a disk assembly 202 having a ferrite disk 232 and a dielectric ring 234 can be metalized to form the metalized disk 250 of FIG. 5. In the example of FIG. 6, the ferrite disk 232 and the dielectric ring 234 can be secured together by an adhesive 238. A surface 236 that will be engaging the ground plane (not shown) can be metalized.

Figure 7:
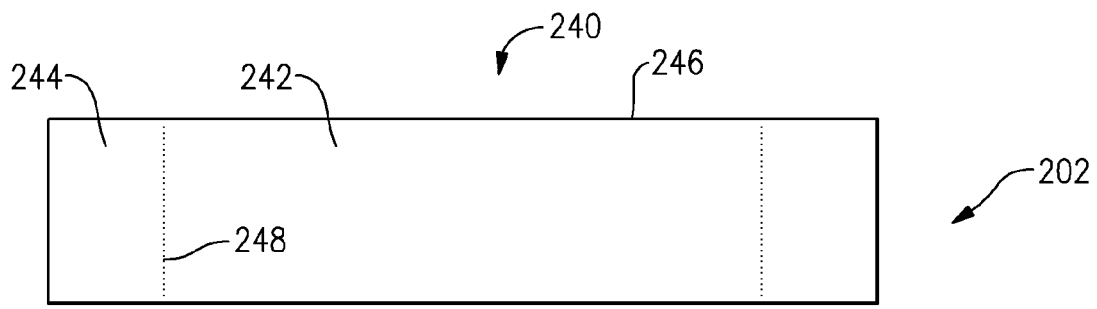
FIG. 7 shows another example of a disk assembly having a ferrite disk and a dielectric ring that can be metalized to form the metalized disk of FIG. 5.

FIG. 7 shows that in some implementations, a disk assembly 202 having a ferrite disk 242 and a dielectric ring 244 can be metalized to form the metalized disk 250 of FIG. 5. In the example of FIG. 7, the ferrite disk 242 and the dielectric ring 244 can be secured together by a co-firing technique. Additional details concerning examples of dielectric materials suitable for such a dielectric ring and the co-firing technique are described herein. Such a co-firing technique can yield a secure adhesive-free joint 248 between the ferrite disk 242 and the dielectric ring 244. A surface 246 that will be engaging the ground plane (not shown) can be metalized as described herein.

In some implementations, the foregoing co-fired configuration can be particularly useful when temperatures associated with metallization techniques exceed temperatures associated with the glued configuration of FIG. 6. For example, some glues that can be utilized to form the joint 238 may be organic and therefore not be able to withstand temperatures in excess of a few hundred degrees C. Using a co-fired assembly, where there is no glue, the assembly can withstand temperatures in excess of 1000° C. Accordingly, it is possible to use metallization techniques such as thick film ink deposition, which use temperatures of less than 1000° C., on co-fired assemblies.

Figure 8:
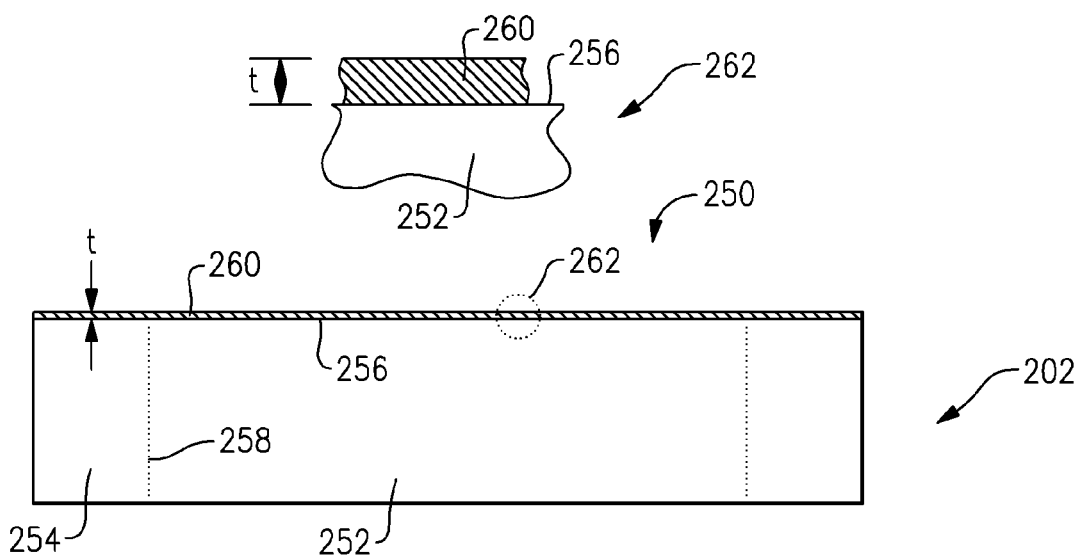
FIG. 8 shows a metalized disk that includes a metalized layer formed on the grounding-side surface of a ferrite-based disk.

FIG. 8 shows a metalized disk 250 that includes a metalized layer 260 formed on the grounding-side surface 256 of a ferrite-based disk 202 (e.g., a ferrite disk 252 surrounded by a dielectric ring 254). As shown in an enlarged view 262, the metalized layer 260 can have a thickness of "t." Examples of such a thickness are described herein in greater detail. In some implementations, metallization techniques such as thick film ink deposition can be utilized to form the metalized layer 260. Other known metallization techniques can also be utilized to form the metalized layer 260.

Figure 9:
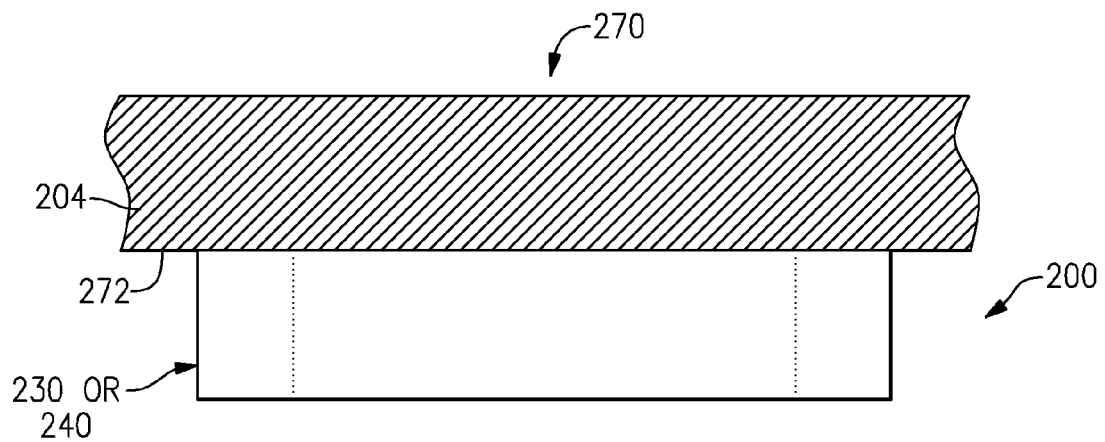
FIG. 9 shows an example configuration where a ferrite-based disk is mounted directly to a surface of a ground plane.
Figure 10:
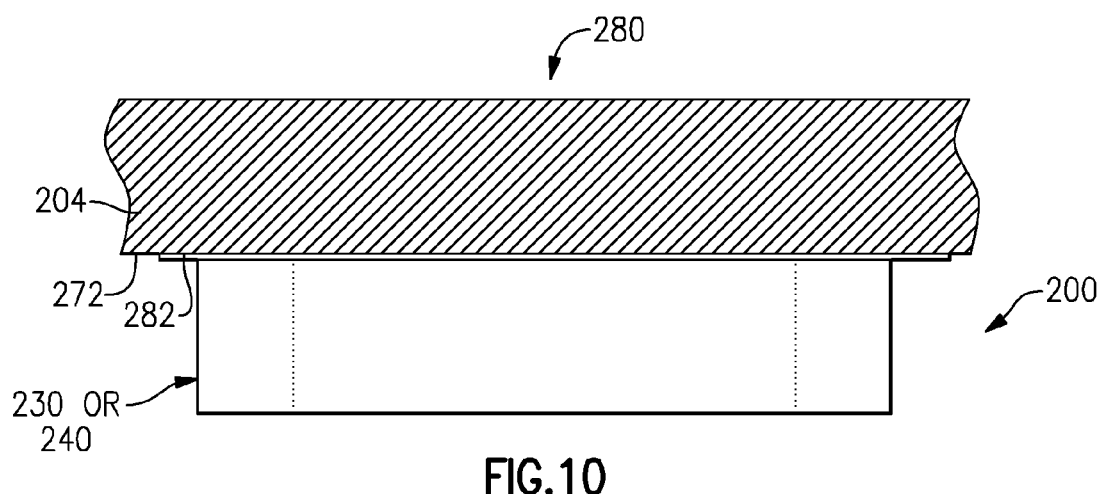
FIG. 10 shows an example configuration where a conductive metal foil is positioned between a ferrite-based disk and a surface of a ground plane.
Figure 11:
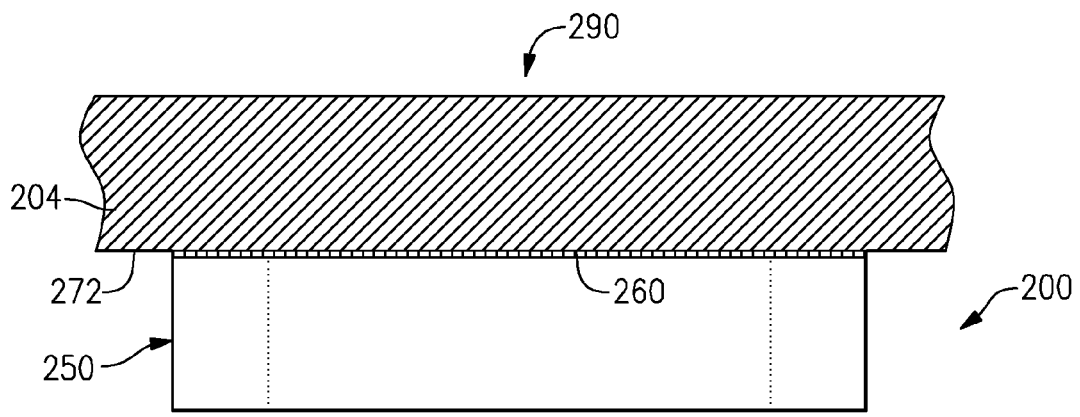
FIG. 11 shows an example configuration where a ferrite-based disk having a metalized surface is mounted to a ground plane so that the metalized surface engages a surface of the ground plane.

FIGS. 9-11 show various configurations of circulators 200 where ferrite-based disks are coupled to a ground plane 204 in different manners. FIG. 9 shows a configuration 270 where a ferrite-based disk (230 of FIG. 6 or 240 of FIG. 7) is mounted directly to a surface 272 of the ground plane 204. FIG. 10 shows a configuration 280 where a conductive metal foil 282 is positioned between a ferrite-based disk (230 of FIG. 6 or 240 of FIG. 7) and a surface 272 of the ground plane 204. FIG. 11 shows a configuration 290 where a ferrite-based disk (250 of FIG. 8) having a metalized surface 260 is mounted to the ground plane 204 so that the metalized surface 260 engages a surface 272 of the ground plane 204.

Figure 12:
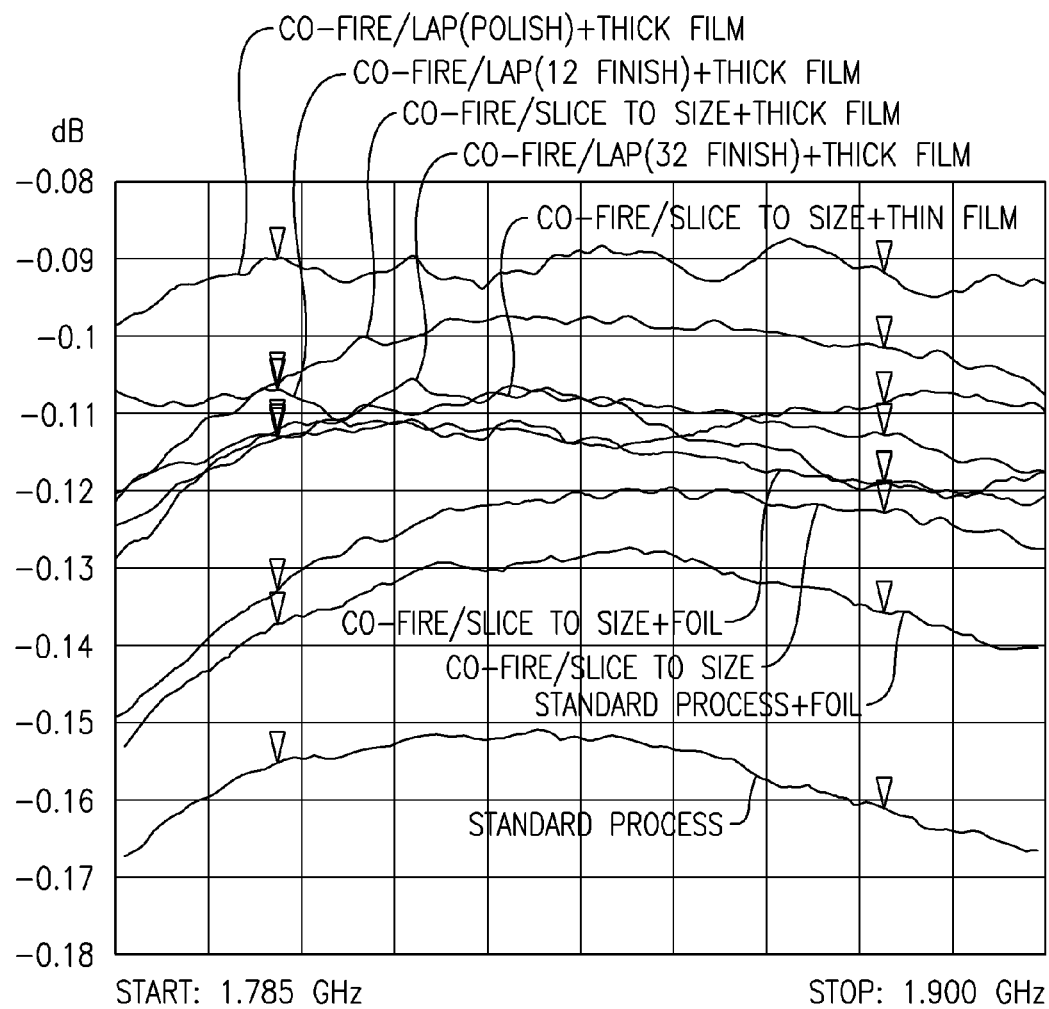
FIG. 12 shows a comparison of insertion loss performance plots for the various configurations of FIGS. 9-11.

FIG. 12 shows a comparison of insertion loss performance plots for various configurations that can be grouped into one of the three configurations of FIGS. 9-11. Table 1 lists measurements corresponding to the various configurations.

TABLE 1

| General configuration | Trace | Trace marker | Frequency | Insertion loss |
|---|---|---|---|---|
| FIG. 9 | Co-fire/Slice to size | 1 | 1.805 GHz | −0.133 dB |
| FIG. 9 | Co-fire/Slice to size | 2 | 1.880 GHz | −0.123 dB |
| FIG. 10 | Co-fire/Slice to size + foil | 3 | 1.805 GHz | −0.113 dB |
| FIG. 10 | Co-fire/Slice to size + foil | 4 | 1.880 GHz | −0.119 dB |
| FIG. 11 | Co-fire/Slice to size + thin film | 5 | 1.805 GHz | −0.113 dB |
| FIG. 11 | Co-fire/Slice to size + thin film | 6 | 1.880 GHz | −0.113 dB |
| FIG. 11 | Co-fire/Slice to size + thick film | 7 | 1.805 GHz | −0.106 dB |
| FIG. 11 | Co-fire/Slice to size + thick film | 8 | 1.880 GHz | −0.102 dB |
| FIG. 9 | Standard process | 9 | 1.805 GHz | −0.155 dB |
| FIG. 9 | Standard process | 10 | 1.880 GHz | −0.161 dB |
| FIG. 10 | Standard process + foil | 11 | 1.805 GHz | −0.137 dB |
| FIG. 10 | Standard process + foil | 12 | 1.880 GHz | −0.136 dB |
| FIG. 11 | Co-fire/Lap (32 finish) + thick film | 13 | 1.805 GHz | −0.112 dB |
| FIG. 11 | Co-fire/Lap (32 finish) + thick film | 14 | 1.880 GHz | −0.119 dB |
| FIG. 11 | Co-fire/Lap (12 finish) + thick film | 15 | 1.805 GHz | −0.107 dB |
| FIG. 11 | Co-fire/Lap (12 finish) + thick film | 16 | 1.880 GHz | −0.109 dB |
| FIG. 11 | Co-fire/Lap (Polish) + thick film | 17 | 1.805 GHz | −0.090 dB |
| FIG. 11 | Co-fire/Lap (Polish) + thick film | 18 | 1.880 GHz | −0.092 dB |

In FIG. 12 and Table 1, "Co-fire" indicates a co-fired assembly of ferrite disk and dielectric ring as described herein in reference to FIG. 7, and "Standard" indicates a glued assembly of ferrite disk and dielectric ring as described herein in reference to FIG. 6. "Slice to size" indicates an as-sliced finish in a range of 20 to 40 micro-inches (0.5 to 1.0 micron). "Lap (32 finish)" indicates a lapped surface finish that is less than 32 micro-inches (less than 0.8 micron). "Lap (12 finish)" indicates a lapped surface finish that is less than 12 micro-inches (less than 0.3 micron). "Lap (Polish)" indicates a polished surface finish that is less than 4 micro-inches (less than 0.1 micron). "Thin film" indicates a metalized layer of silver with a thickness of about one skin depth; and "thick film" indicates a metalized layer of silver with a thickness of about two skin depths.

The standard process used for comparison was a glued, outside diameter sawn and surface ground (32 micro-inch) assembly in the ferrite device at 1.805 and 1.880 GHz (markers 9 and 10). This was then compared with a standard process assembly with metal foil as the ground plane (markers 11 and 12). These results were then compared with the co-fired and sliced to size assemblies (as-sliced finish) with (markers 3 and 4) and without foil (markers 1 and 2). These results showed that the improvement due to co-firing was approximately 0.02 dB, and the improvement due to foil versus no foil was also about 0.02 dB.

To test the effect of microwave skin depth, which is approximately 4 microns for metalized layers of aluminum, gold or silver at 2 GHz, the effect of using x1 and x2 skin depths of silver metalized film was measured. The results show that thin film metallization of about one-skin depth (markers 5 and 6) was slightly more effective than foil (markers 3 and 4). The two-skin depths configuration (markers 7 and 8) provided an improvement of approximately 0.01 dB over the foil configuration (markers 3 and 4).

Using the two-skin depth thickness of thick film silver, the insertion loss then was progressively reduced from a lapped 32 micro-inch (markers 13 and 14) to an as-sliced finish (markers 7 and 8), to a lapped 12 micro-inch (markers 15 and 16) and finally a polished 4 micro-inch finish (markers 17 and 18). The example effect of surface finish of the assembly on the ground plane side, with thick film silver of approximately twice the skin depth, is shown in FIG. 13.

The foregoing example results indicate that significant improvements in insertion loss performance can be obtained with co-fired assemblies over glued assemblies. Improvements in insertion loss performance can also be obtained with a metalized film formed on the grounding surface of a ferrite-based assembly. An increased thickness of such a metalized film can provide significant improvements in insertion loss performance. In some embodiments, a metalized film having a thickness "t" can be formed on the grounding surface of a ferrite-based assembly, and such a thickness can be based on skin depth associated with a range or value of frequency and a metal being used (e.g., aluminum, gold, copper, tin, nickel, silver, or alloy of these metals). In some embodiments, the metalized film thickness "t" can be at least 0.5 times the skin depth, at least 1.0 times the skin depth, at least 1.5 times the skin depth, or at least 2.0 times the skin depth.

Figure 13:
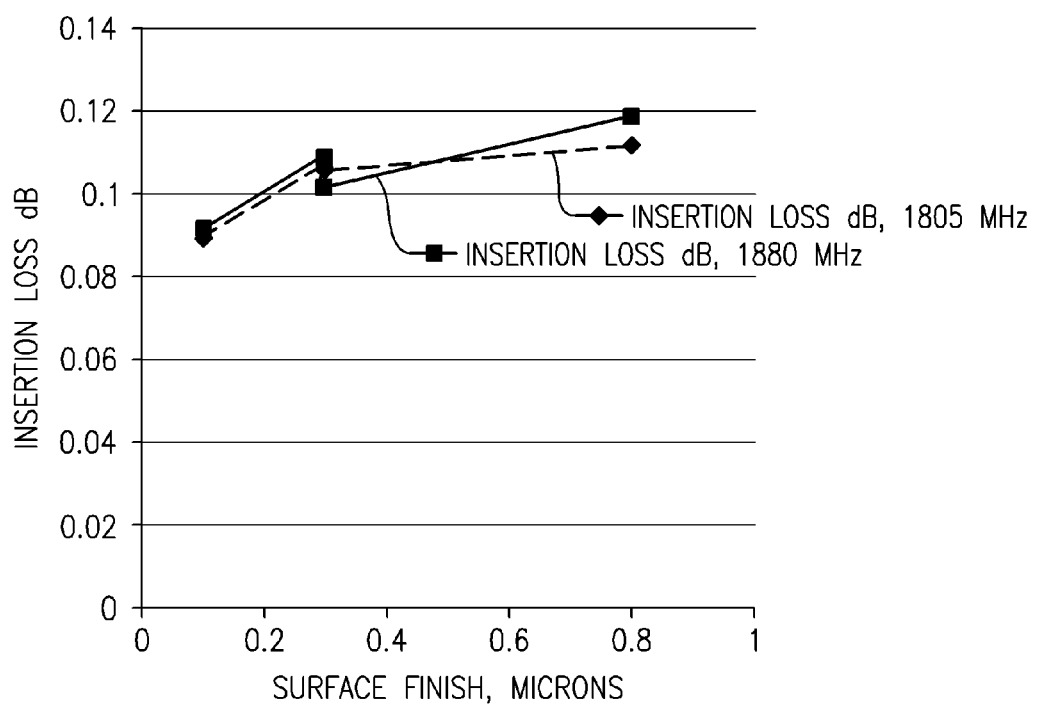
FIG. 13 shows an example of how surface finish of a ferrite-based device can affect insertion loss performance.

As shown in FIG. 13, significant improvements in insertion loss performance can be obtained by providing finer surface finishes on the side of the ferrite-based assembly that is metalized. In some embodiments, a surface finish can be provided on a ferrite based assembly as described herein so that an average value of feature sizes on the surface is less than or equal to approximately 1.0 micron, 0.8 micron, 0.6 micron, 0.5 micron, 0.4 micron, 0.3 micron, 0.2 micron, or 0.1 micron.

Figure 14:
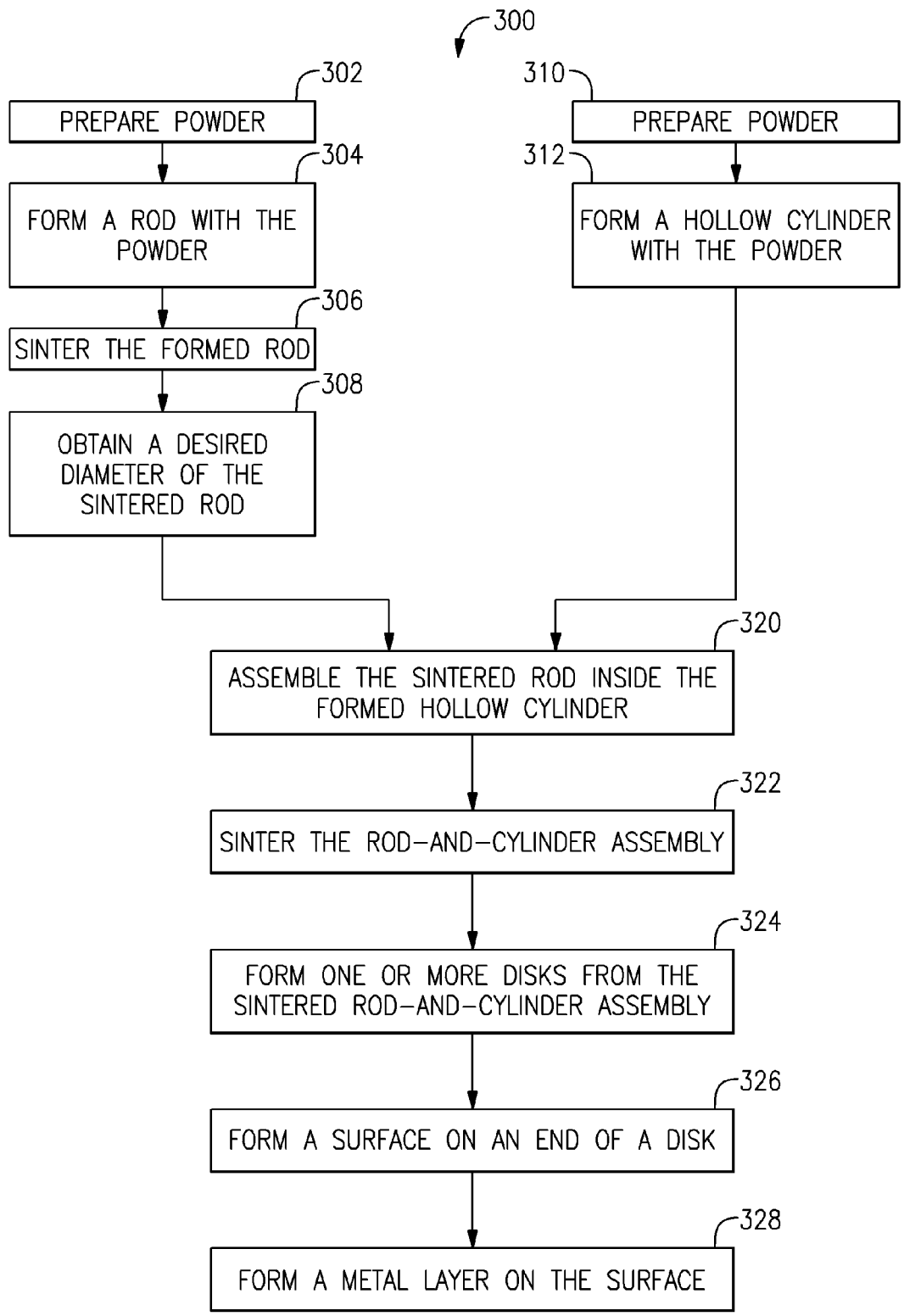
FIG. 14 shows a process that can be implemented to fabricate a metalized ferrite-based assembly having one or more features described herein.
Figure 15:
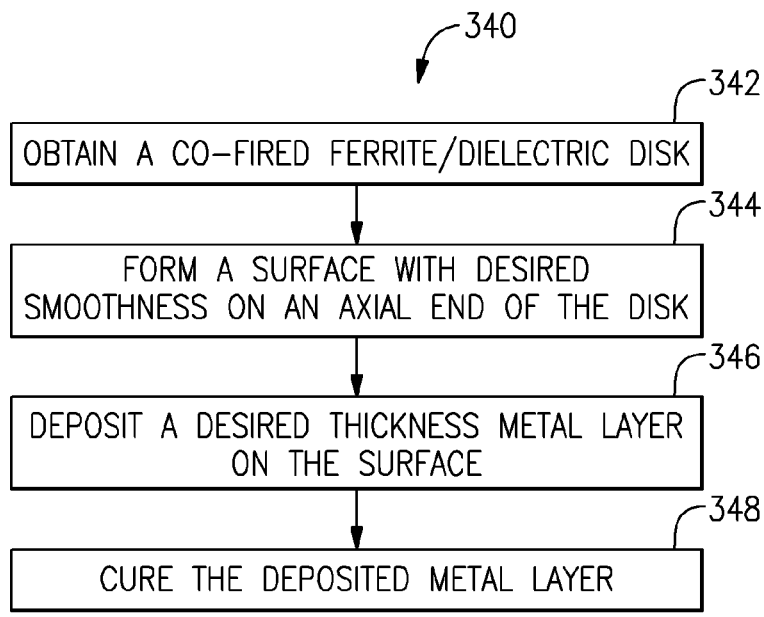
FIG. 15 shows a process that can be implemented as a more specific example of the metal layer formation step of FIG. 14.
Figure 16:
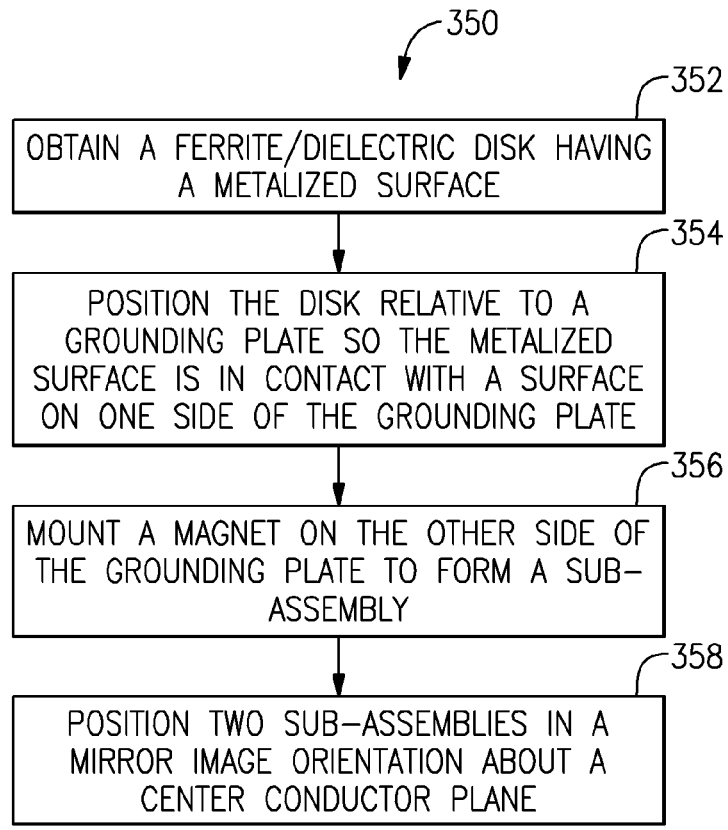
FIG. 16 shows a process that can be implemented to manufacture a device such as a circulator that includes a ferrite/dielectric disk having one or more features described herein.

FIGS. 14-16 show example processes that can be implemented to fabricate a metalized ferrite-based assembly and a circulator/isolator using such an assembly. FIG. 14 shows a process 300 that can be utilized to fabricate a metalized ferrite-based assembly. A ferrite rod can be fabricated based on blocks 302 to 308, and a dielectric cylinder can be fabricated based on blocks 310 and 312. When assembled and cut into disks, the ferrite rod yields a ferrite disk (e.g., 252 in FIG. 8), and the dielectric cylinder yields a dielectric ring (e.g., 254).

In block 302, powder for forming the ferrite rod can be prepared. In some implementations, such a powder can be by mixing selected raw materials to yield a dry granulated mixture. The granulated mixture can be pre-sintered to yield a pre-sintered material. The pre-sintered material can be milled to yield reduced particle size of the pre-sintered material. Such a milling process can yield refined and regulated particles from the pre-sintered material. The milled material can be dried by, for example, a spray-drying process. Such a spray-drying process can be used to produce free-flowing powder suitable for forming by, for example, pressing. The spray-dried powder material can be separated into one or more groups of particle-size ranges to yield one or more powders having desired ranges of particle sizes.

In block 304, a rod can be formed from the powder. In some implementations, such a rod can be formed by techniques such as press-forming or extrusion.

In block 306, the formed rod can be pre-sintered to yield a reduced lateral dimension such as diameter. In block 308, a desired lateral dimension (e.g., diameter) can be obtained by, for example, machining of the rod.

To fabricate the dielectric cylinder, powder with desired contents can be prepared in block 310. In some implementations, such powder preparation can be similar to that described in reference to block 302. In block 312, a hollow cylinder can be formed from the prepared powder. In some implementations, such a cylinder can be formed by techniques such as press-forming or extrusion.

In block 320, the pre-sintered rod and the un-sintered cylinder can be assembled. As described herein, such a configuration allows the cylinder to fit over the rod, and upon co-firing of the assembly (block 322), the cylinder can shrink around the pre-shrunk rod to thereby yield a glue-less and robust joint.

In block 324, one or more disks can be formed (e.g., cut) from the co-fired rod-and-cylinder assembly. In block 326, a desired finish surface can be formed on a grounding side of a cut disk. In block 328, a metal layer can be formed on the finished surface.

FIG. 15 shows a process 340 that can be implemented as a more specific example of block 328 of FIG. 14. In block 342, a co-fired ferrite/dielectric disk assembly can be obtained. In block 344, a surface having a desired smoothness can be formed on a grounding side of the ferrite/dielectric disk assembly. In block 346, a metal layer having a desired thickness can be deposited on the smoothed surface. In block 348, the deposited metal layer can be cured.

FIG. 16 shows a process 350 that can be implemented to assemble, for example, a circulator device of FIG. 3 based on a ferrite/dielectric disk having one or more features described herein. In block 352, a ferrite/dielectric disk assembly having a metalized grounding surface can be obtained. In block 354, the disk assembly can be positioned relative to a grounding plate so that the metalized surface of the disk assembly is in contact with a surface on one side of the grounding plate. In block 356, a magnet can be mounted on the other side of the grounding plate to form a sub-assembly. In block 358, two of such sub-assemblies can be positioned in an approximate mirror image orientation about a center conductor plate to yield a circulator device.

Figure 17:
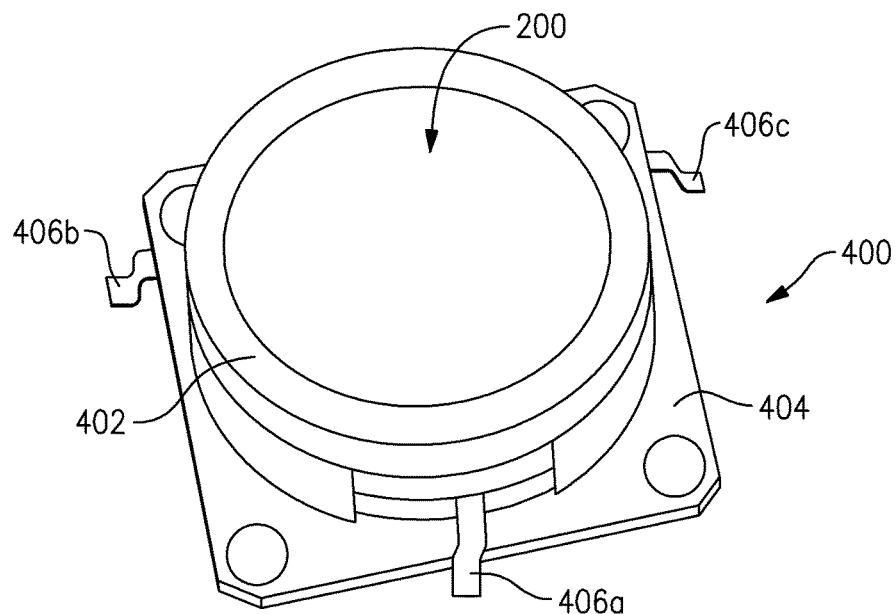
FIG. 17 shows an example packaged device having a circulator device mounted on a packaging platform and enclosed by a housing structure.

In some embodiments, a circulator device fabricated in the foregoing manner and having one or more features as described herein can be implemented as a packaged modular device. FIG. 17 shows an example packaged device 400 having a circulator device 200 mounted on a packaging platform 404 and enclosed by a housing structure 402. The example platform 404 is depicted as including a plurality of holes dimensioned to allow mounting of the packaged device 400. The example packaged device 400 is shown further include example terminals 406a-406c configured to facilitate electrical connections to, for example, the three circulator/isolator ports described herein in reference to FIGS. 1 and 2.

Figure 18:
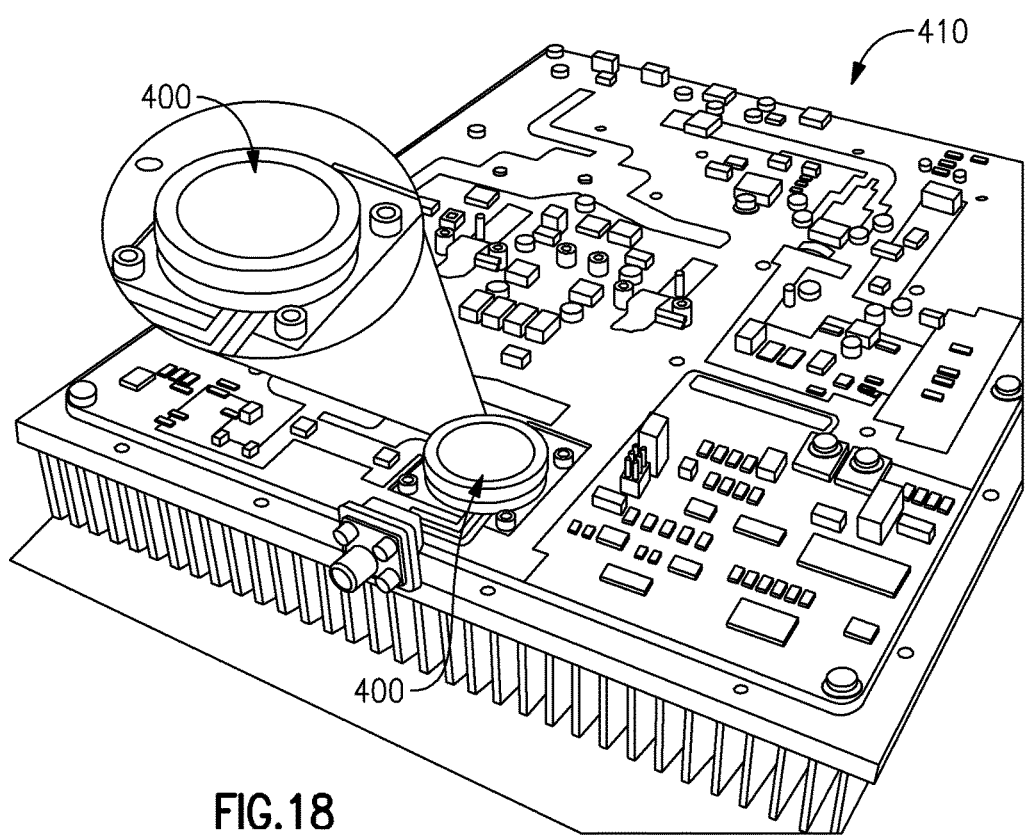
FIG. 18 shows that in some embodiments, a packaged module such as the example of FIG. 17 can be implemented in a circuit board or a module.

FIG. 18 shows that in some embodiments, a packaged module 400 such as the example of FIG. 17 can be implemented in a circuit board or module 410. Such a circuit board can include a plurality of circuits configured to perform one or more radio-frequency (RF) related operations. The circuit board 410 can also include a number of connection features configured to allow transfer of RF signals and power between the circuit board 410 and components external to the circuit board 410.

Figure 19:
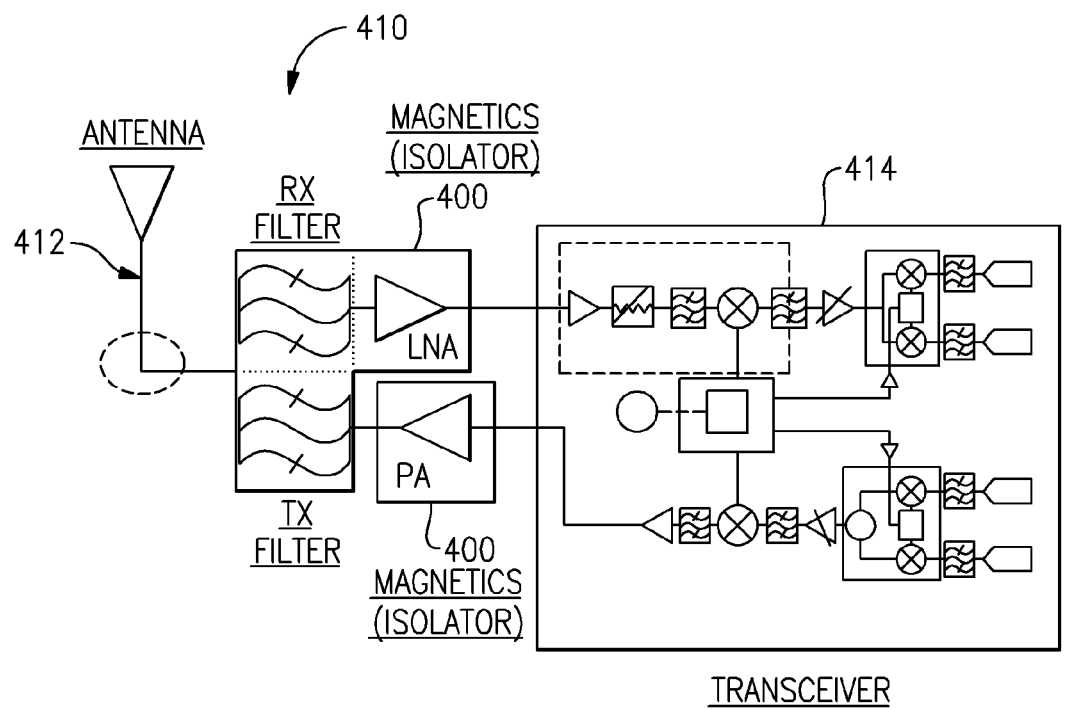
FIG. 19 shows that in some embodiments, the example circuit board if FIG. 18 can be implemented in a front-end module of an RF apparatus.

In some embodiments, the example circuit board 410 can include RF circuits associated with a front-end module of an RF apparatus. As shown in FIG. 19, such an RF apparatus can include an antenna 412 that is configured to facilitate transmission and/or reception of RF signals. Such signals can be generated by and/or processed by a transceiver 414. For transmission, the transceiver 414 can generate a transmit signal that is amplified by a power amplifier (PA) and filtered (Tx Filter) for transmission by the antenna 412. For reception, a signal received from the antenna 412 can be filtered (Rx Filter) and amplified by a low-noise amplifier (LNA) before being passed on to the transceiver 414. In the example context of such Tx and Rx paths, circulators and/or isolators 400 having one or more features as described herein can be implemented at or in connection with, for example, the PA circuit and the LNA circuit.

Figure 20:
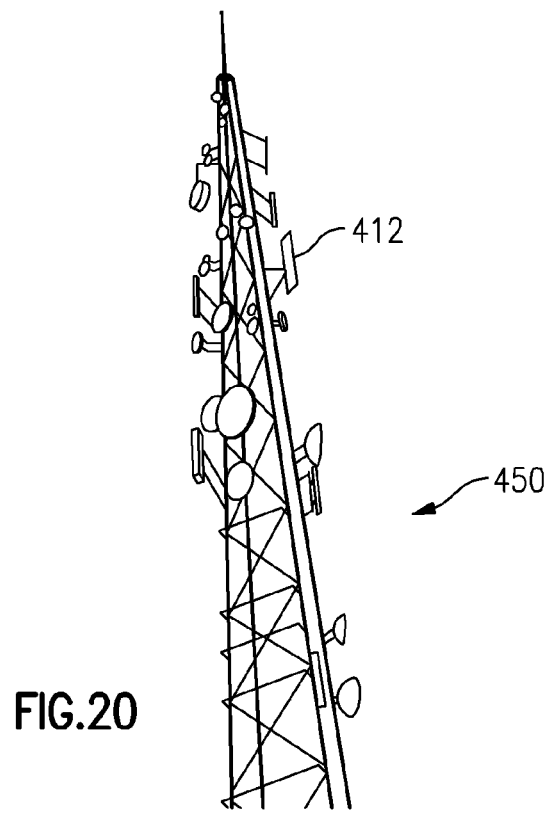
FIG. 20 depicts an example wireless base-station having one or more antennas that can be coupled to circuits and devices having one or more circulators/isolators as described herein.

In some embodiments, circuits and devices having one or more features as described herein can be implemented in RF applications such as a wireless base-station. FIG. 20 depicts an example wireless base-station 450 having one or more antennas 412 configured to facilitate transmission and/or reception of RF signals. Such antenna(s) can be coupled to circuits and devices having one or more circulators/isolators as described herein.

As described herein, some circulator/isolators can be based on composite disk assemblies, with each having a ferrite rod within a dielectric cylinder. Some of such disk assemblies can be formed utilizing a co-firing technique. Examples related to such a co-firing technique are described in reference to FIGS. 21-27. Examples of compositions and methods that can be implemented to form dielectric materials (e.g., for the dielectric cylinder) are also described in reference to FIGS. 28-30.

Examples Related to Co-Firing of Magnetic and Dielectric Materials

A method for making a composite magnetic-dielectric disc assembly can include forming a dielectric ceramic cylinder, forming a magnetic ceramic rod, assembling the magnetic ceramic rod coaxially inside the dielectric ceramic cylinder to form a rod-and-cylinder assembly, kilning (firing) the rod-and-cylinder assembly, slicing the rod-and-cylinder assembly to form a plurality of composite magnetic-dielectric disc-shaped assemblies. The magnetic-dielectric disc assemblies can be used in manufacturing, for example, circulators, isolators or similar electronic components. Accordingly, the method for making the disc assemblies can be included as part of a method for making such electronic components.

Circulators and isolators can be configured as passive electronic devices that are used in high-frequency (e.g., microwave) radio frequency systems to permit a signal to pass in one direction while providing high isolation to reflected energy in the reverse direction. Circulators and isolators can commonly include a disc-shaped assembly having a disc-shaped ferrite or other ferromagnetic ceramic element, disposed concentrically within an annular dielectric element. A commonly used ferrite materials can include yttrium-iron-garnet (YIG), due to its low-loss microwave characteristics. The annular dielectric element can be made of ceramic material.

Figure 21:
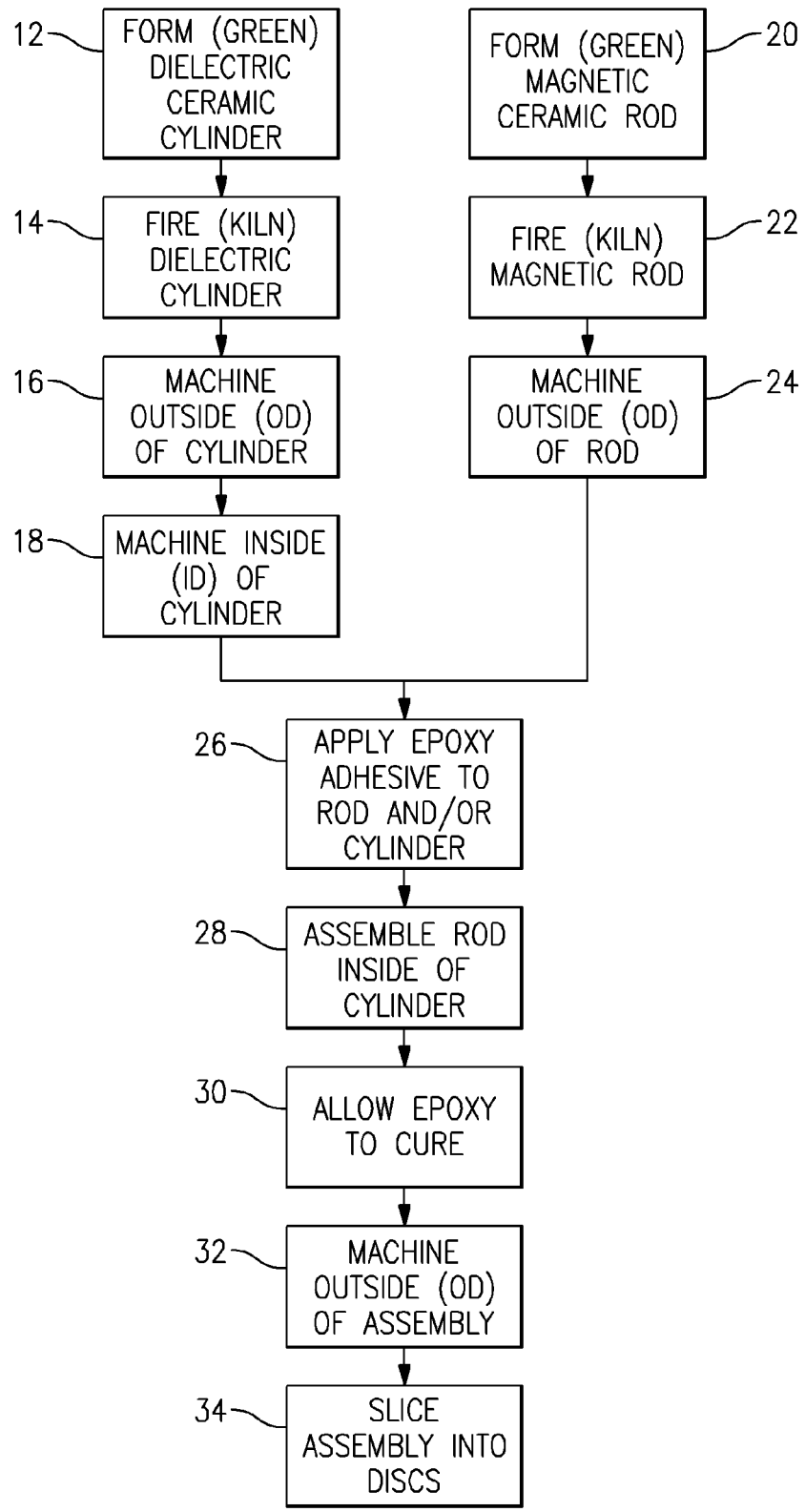
FIG. 21 shows a process that can be implemented to fabricate composite disk assemblies.

An example process for making the above-referenced composite disc assemblies is illustrated by the flow diagram of FIG. 21. At step 12, a cylinder can be formed from a dielectric ceramic material. At step 14, the (unfired or "green") cylinder can be fired in a kiln (commonly referred to simply as "firing"). At step 16, the outside surface of the cylinder can be machined to ensure its outside diameter (OD) is of a selected dimension. Achieving precise dimensions in the assembly elements can be important because the dimensions can affect microwave waveguide characteristics. At step 18, the inside surface of the cylinder can be similarly machined to ensure its inside diameter (ID) is of a selected dimension. In addition, at step 20, a rod can be formed from a magnetic ceramic material. At step 22, the rod can be fired, and at step 24 its surface can be machined to a selected OD. The rod OD can be slightly less than the cylinder OD so that the rod can be fitted securely within the cylinder, as described herein. Achieving a close fit that promotes good adhesion between the rod and cylinder can be a reason that both the outside surface of the rod and the inside surface of the cylinder are machined to precise tolerances.

At step 26, epoxy adhesive can be applied to the one or both of the rod and cylinder. At step 28, the rod can be inserted inside the cylinder to form a rod-and-cylinder assembly, and the epoxy can be allowed to cure (harden), as indicated by step 30. At step 32, the outside surface of the rod-and-cylinder assembly can be machined to a precise OD. At step 34, the rod-and-cylinder assembly can be sliced into a number of disc assemblies. Each disc assembly thus can include a magnetic ceramic disc disposed concentrically within a dielectric ceramic ring. Each disc assembly can have a thickness of, for example, several millimeters.

In some implementations, the time involved in machining the inside surface of the cylinder to promote adhesion, applying epoxy to the parts, carefully handling and assembling the epoxy-laden parts, and curing the epoxy, can contribute to inefficiency in the process.

In accordance with some implementations, a method for making a composite magnetic-dielectric disc assembly can include forming a dielectric ceramic cylinder, forming a magnetic ceramic rod, assembling the magnetic ceramic rod coaxially inside the dielectric ceramic cylinder to form a rod-and-cylinder assembly, firing the rod-and-cylinder assembly, slicing the rod-and-cylinder assembly to form a plurality of composite magnetic-dielectric disc-shaped assemblies. The magnetic-dielectric disc assemblies can be used in manufacturing, for example, circulators, isolators or similar electronic components. Accordingly, the method for making disc assemblies can be included as part of a method for making such electronic components.

Figure 22:
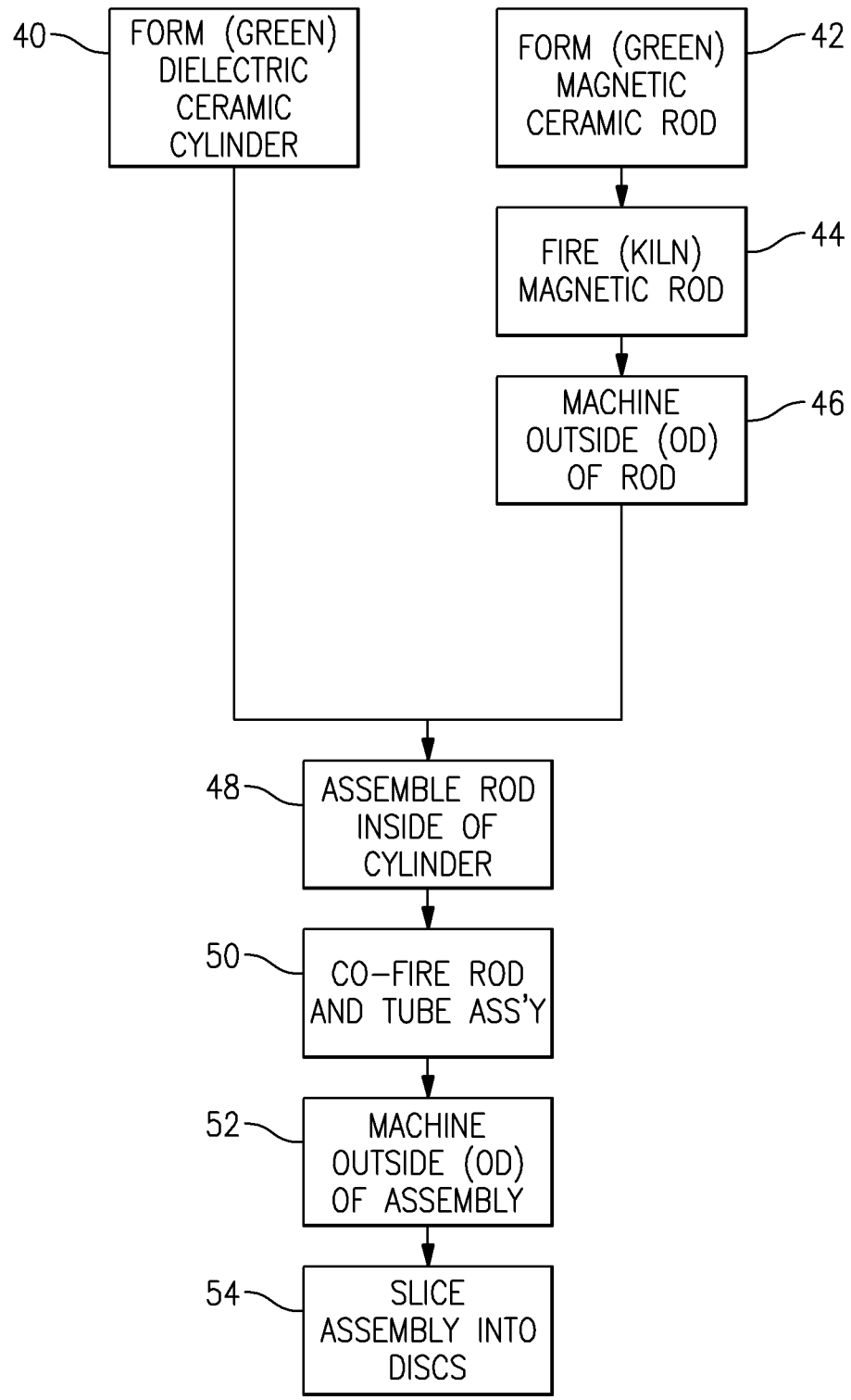
FIG. 22 shows a process that can be implemented to fabricate composite disk assemblies utilizing a co-firing technique.
Figure 23:
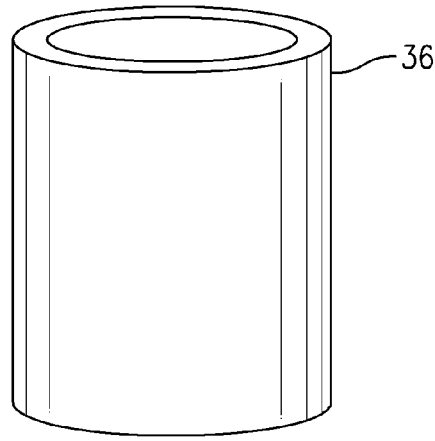
FIG. 23 shows an example cylinder that can be formed from a dielectric ceramic material.
Figure 24:
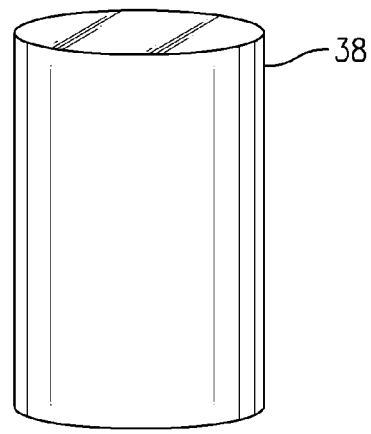
FIG. 24 shows an example ferrite rod that can be dimensioned to fit within the cylinder of FIG. 23 for co-firing.

In accordance with some implementations, a process for making composite magnetic-dielectric disc assemblies is illustrated by the flow diagram of FIG. 22. Referring briefly to FIGS. 23-27, the process can involve a dielectric ceramic cylinder 36 and a magnetic ceramic rod 38.

Returning to FIG. 22, at step 40, cylinder 36 (FIG. 23) can be formed from a dielectric ceramic material by, for example, any suitable conventional process known in the art for making such elements (e.g., dielectric ceramic elements of the types used in high frequency electronic components). Similarly, at step 42, rod 38 (FIG. 24) can be formed from a magnetic ceramic material by, for example, any suitable conventional process. At step 44, rod 38 can be sintered by firing it in a kiln (not shown). Some examples of materials and firing temperatures are set forth below, following this process flow description. However, it will be understood that other materials and processes can be utilized.

Figure 25:
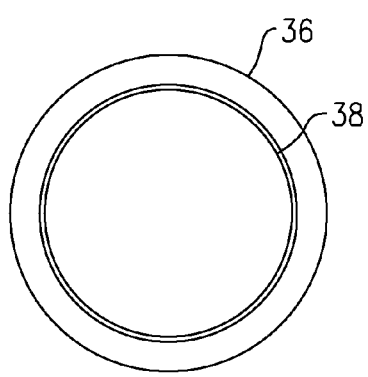
FIG. 25 shows a stage where a pre-fired ferrite rod is inserted into an unfired cylinder to form a rod-and-cylinder assembly for co-firing.

At step 46, the outside surface of rod 38 can be machined to ensure it is of an outside diameter (OD) that is less than the inside diameter (ID) of cylinder 36. At step 48, (the now pre-fired) rod 38 can be received in (the unfired or "green") cylinder 36 to form the rod-and-cylinder assembly shown in FIG. 25. Though FIG. 25 is not necessarily to scale, it is noted that the OD of rod 38 can be slightly smaller than the ID of cylinder 36 to enable rod 38 to be received in cylinder 36.

Figure 26:
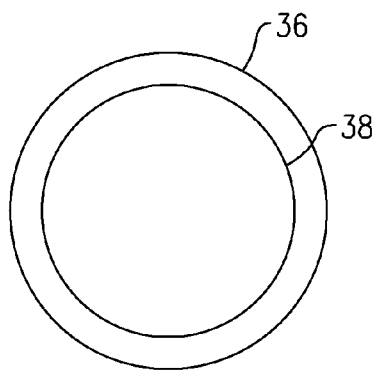
FIG. 26 shows the ferrite rod and the dielectric cylinder secured together by the co-firing process.

At step 50, cylinder 36 and rod 38 can be co-fired. That is, the rod-and-cylinder assembly (FIG. 25) can be fired. The co-firing temperature is preferably lower than the temperature at which rod 38 was fired at step 44, to ensure that the physical and electrical properties of rod 38 remain unchanged. The co-firing temperature can be within a known range in which such cylinders are conventionally fired. In some embodiments, co-firing can cause cylinder 36 to shrink around rod 38, thereby securing them together, as shown in FIG. 26. At step 52, the outside surface of the rod-and-cylinder assembly can be machined to ensure it is of a specified or otherwise predetermined OD.

Figure 27:
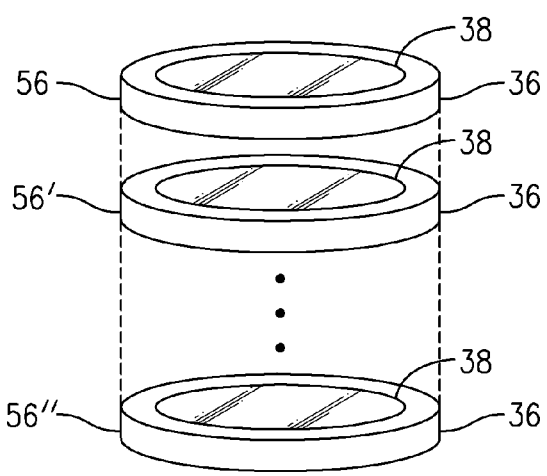
FIG. 27 shows that the co-fired rod-and-cylinder assembly can be sliced into a plurality of composite magnetic-dielectric disk assemblies.

At step 54, the rod-and-cylinder assembly can be sliced into composite magnetic-dielectric disc assemblies 56, shown in FIG. 27. Composite magnetic-dielectric disc assemblies 56 can be used in manufacturing high frequency electronic components. The example method described herein in reference to FIGS. 22-27 can be more economical than methods that utilize adhesives.

In an example, rod 38 can be made of yttrium-iron-garnet fired at or above about 1400 degrees C. Suitable material of this type is commercially available from a number of sources, including, for example, Trans-Tech, Inc. (a subsidiary of Skyworks Solutions, Inc.) of Adamstown, Md. Cylinder 36 can be made of a ceramic material having a composition of MgO—CaO—ZnO—Al2O3-TiO2 co-fired with rod 38 at a temperature of about 1310 degrees C.

In another example, rod 38 can be made of calcium and vanadium-doped yttrium-iron-garnet fired at a temperature at or above 1350 degrees C. Suitable material of this type is commercially available from a number of sources, including Trans-Tech, Inc. (a subsidiary of Skyworks Solutions, Inc.) of Adamstown, Md. Cylinder 36 can be made of a ceramic material having a composition of MgO—CaO—ZnO—Al2O3-TiO2 co-fired with rod 38 at a temperature of about 1310 degrees C.

Examples Related to Dielectric Ceramic Compositions

In some implementations, dielectric parts described herein (e.g., dielectric ceramic cylinder 36 of FIGS. 23-27) can include a dielectric ceramic composition having a main component group, where the main component group can be represented by $Mg_xCa_yZn_zTiO_{2+x+y+z}$, where the sum of x, y, and z is less than or equal to 1.0 such that the dielectric ceramic composition has a wider sintering temperature range and reduced exaggerated grain growth. In an example, x can be greater than 0.0 and less than 1.0, y can be greater than 0.0 and less than 1.0, and z can be greater than 0.0 and less than 1.0. The dielectric ceramic composition can further include between 0.0 and 50.0 percent by weight of aluminum oxide. The dielectric ceramic composition can further include copper oxide. The dielectric ceramic composition can further include boron oxide.

Dielectric ceramic compositions, such as dielectric ceramic compositions that include magnesium (Mg), calcium (Ca), and titanium (Ti), are commonly used in devices such as dielectric filters, dielectric resonators, and dielectric couplers in various types of radio-frequency (RF) and microwave systems. However, a dielectric ceramic composition that includes Mg, Ca, and Ti, typically has a narrow sintering temperature range and exaggerated grain growth. Since the narrow sintering temperature range is more difficult to maintain in the sintering kiln, such dielectric ceramic may be under-fired (e.g., sintered at a temperature below a desired temperature range) or over-fired (e.g., sintered at a temperature above the desired temperature range) in the sintering kiln. Under-firing and over-firing can cause various problems in the resulting dielectric composition.

For example, under-firing can cause undesirable variations in the dielectric constant, low density, and reduced mechanical strength. In another example, over-firing can cause undesirable exaggerated grain growth, which can also reduce the mechanical strength. Furthermore, under-firing or over-firing caused by a narrow sintering temperature range can result in low manufacturing yield.

In some implementations, a dielectric ceramic composition can have a wide sintering temperature range and a reduced exaggerated grain growth. In some implementations, a dielectric ceramic composition can include a main component group, where the main component group is represented by $Mg_xCa_yZn_zTiO_{2+x+y+z}$, where the sum of x, y, and z is less than or equal to 1.0 such that the dielectric ceramic composition has a wider sintering temperature range and reduced exaggerated grain growth. In some embodiments, x can be greater than 0.0 and less than 1.0, y can be greater than 0.0 and less than 1.0, and z can be greater than 0.0 and less than 1.0.

In some embodiments, the dielectric ceramic composition can further include between 0.0 and 50.0 percent by weight of aluminum oxide. The dielectric ceramic composition can further include copper oxide. The dielectric ceramic composition can further include boron oxide.

In some embodiments, "x," "y," and "z" in $Mg_xCa_yZn_zTiO_{2+x+y+z}$ can determine the respective relative ratio of Mg (magnesium), Ca (calcium), and Zn (zinc). The ratio of "O" (oxygen) in the main component group can be determined by the sum 2+x+y+z. In an example embodiment, "x" can be between 0.0 and 2.0, "y" can be greater than 0.0 and less than or equal to 1.0, "z" can be between 0.0 and 0.03, and "x+y+z" can be between 1.0 and 2.0. In another example embodiment, "x" can be between 0.0 and 2.0, "y" can be greater than 0.0 and less than or equal to 1.0, "z" can be greater than 0.09 and less than or equal to 1.0, and "x+y+z" can be between 1.0 and 2.0.

In some embodiments, an amount of aluminum oxide ($Al_2O_3$) can be added to the main component group ($Mg_xCa_yZn_zTiO_{2+x+y+z}$). By way of an example, between 0.0 and 50.0 percent by weight of $Al_2O_3$ can be added to the main component group. For the purpose of description, "percent by weight" can defined as the percentage of the weight of the main component group of the dielectric ceramic composition that is added by the additional component, such as $Al_2O_3$. For example, if the main component group of the dielectric ceramic composition weighs 100.0 kilograms, an addition of 50.0 percent by weight of $Al_2O_3$ would be equal to an amount of $Al_2O_3$ weighing 50.0 kilograms.

The addition of $Al_2O_3$ to the main component group can alter the processing parameters, such as the sintering temperature, and other properties of the dielectric ceramic composition. In other embodiments, between 0.0 and 8.0 percent by weight of boron oxide ($B_2O_3$) and/or between 0.0 and 8.0 percent by weight of copper oxide (CuO) can be added to the main component group to reduce the sintering temperature (e.g., the final firing temperature) of the dielectric ceramic composition.

FIG. 28 shows a table with example compositional range of example dielectric ceramic compositions in accordance with respective embodiments described herein. Table 1100 shows a summation of the compositional range of dielectric ceramic compositions according to various respective embodiments as described herein. Table 1100 includes columns 1102, 1104, 1106, 1108, 1110, and rows 1112, 1114, and 1116. In table 1100, column 1102 shows the range of "x," column 1104 shows the range of "y," column 1106 shows the range of "z," column 1108 shows the range of "x+y+z," and column 1110 shows the percent by weight of $Al_2O_3$ that can be added to the main component group ($Mg_xCa_yZn_zTiO_{2+x+y+z}$). Rows 1112, 1114, and 1116 in table 1100 show the ranges of "x," "y," "z," and "x+y+z" and the percent by weight of $Al_2O_3$ in respective example embodiments of the dielectric ceramic composition.

FIG. 29 shows a table with example electrical properties and example sintering temperatures of example dielectric ceramic compositions described herein. Table 1200 includes columns 1202a through 1202i and rows 1204a through 1204n. In table 1200, columns 1202a, 1202b, 1202c, and 1202d show respective values of "x," "y," "z," and "x+y+z" in the main component group ($Mg_xCa_yZn_zTiO_{2+x+y+z}$). Column 1202e shows the percent by weight of $Al_2O_3$, CuO, or $B_2O_3$, column 1202f shows the value of the dielectric constant ($\in'$), column 1202g shows the value of the temperature coefficient of frequency (τf) in parts per million per degree centigrade (PPM/° C.), column 1202h shows the value of the quality factor times frequency (Q×F) in gigahertz (GHz), and column 1202i shows the value of the sintering temperature in ° C. In table 1200, rows 1204a through 1204n show the dielectric ceramic composition, electrical properties, and sintering temperature of respective example embodiments.

As shown in rows 1204j, 1204k, and 1204i of table 1200, for the same dielectric ceramic composition (e.g., for the same values of "x," "y," "z," and "x+y+z" and the same percent by weight of $Al_2O_3$), a dielectric ceramic composition can achieve a wide sintering temperature range of 85.0° C. (e.g., between 1275.0° C. and 1360.0° C.). Additionally, a dielectric ceramic composition can have a dielectric constant of approximately 20.0, a uniform density, and significantly reduced exaggerated grain growth. As a result, a dielectric ceramic composition can have an increased manufacturing yield. In contrast, other dielectric ceramic compositions that include Mg, Ca, and Ti typically have a narrow sintering temperature range of approximately 5.0° C. to 10.0° C. As a result of the narrow sintering temperature range, the such dielectric ceramic compositions can have a varying dielectric constant, significant exaggerated grain growth, and non-uniform density, which can cause a reduced manufacturing yield. Additionally, as shown in row 1204n of table 1200, with the addition of 1.0 percent by weight of $B_2O_3$, an embodiment of the dielectric ceramic composition can have a low sintering temperature of 1000.0° C.

Figure 30:
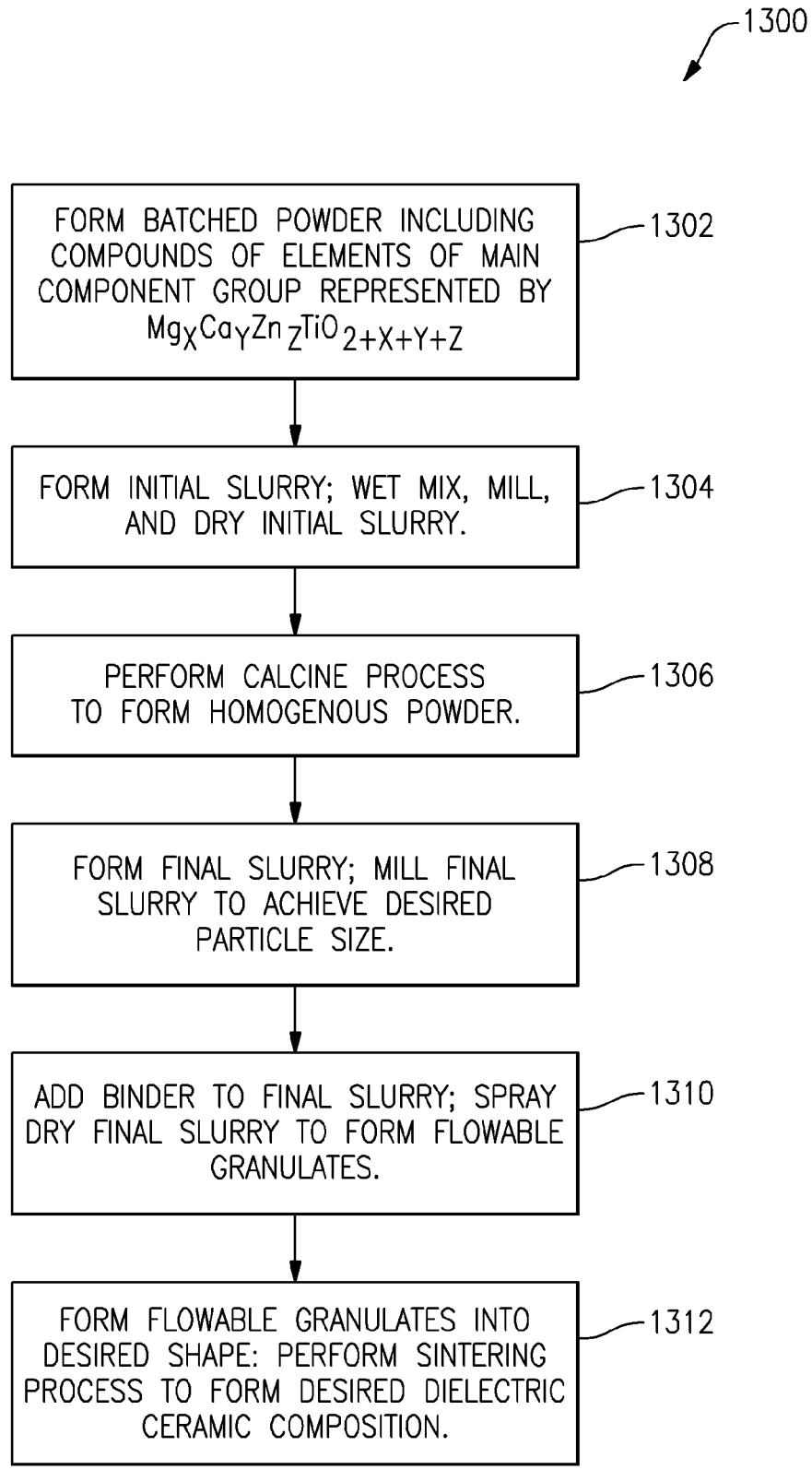
FIG. 30 shows a process that can be implemented for forming a dielectric ceramic composition having one or more features as described herein.

FIG. 30 shows a flowchart illustrating an example method for forming a dielectric ceramic composition having one or more features as described herein. Certain details and features have been left out of flowchart 1300 that are apparent to a person of ordinary skill in the art.

At step 1302 of flowchart 1300, a batched powder can be formed including compounds of elements of a main component group represented by $Mg_xCa_yZn_zTiO_{2+x+y+z}$. The batched powder can include MgO, $CaCO_3$, ZnO, and $TiO_2$, which are compounds of respective elements Mg, Ca, Zn, and Ti of the main component group. The batched powder can be formed by appropriately weighing out MgO, $CaCO_3$, ZnO, and $TiO_2$ according to ratios determined by selected values of "x," "y," and "z" as described herein. In other embodiments, different compounds of the elements Mg, Ca, Zn, and Ti of the main component group may be used to form the batched powder.

In some embodiments, the values "x," "y," and "z" can be greater than 0.0 and less than 1.0 and the value of "x+y+z" can be less than or equal to one. In other embodiments, the value of "x" can be greater than 0.0 and less than 2.0, the value of "y" can be greater than 0.0 and less than or equal to 1.0, the value of "z" can be greater than 0.0 and less than 0.03 or greater than 0.09 and less than or equal to 1.0, and the value of "x+y+z" can be greater than 1.0 and less than 2.0.

After the batched powder has been formed, between 0.0 and 50.0 percent by weight of $Al_2O_3$ can be added to the batched powder. In an example, between 0.0 and 50.0 percent by weight of $Al_2O_3$ can be added to the fabrication process at a subsequent process step. In other embodiments, between 0.0 and 8.0 percent by weight of $B_2O_3$ and/or between 0.0 and 8.0 percent by weight of CuO can be added to the batched powder to reduce the sintering temperature.

At step 1304, an initial slurry can be formed and the initial slurry can be wet mixed, milled, and dried. The initial slurry can be formed by adding an appropriate dispersing agent and deionized water to the batched powder. The initial slurry can then be wet mixed, milled, and dried in an oven to form a mechanical mixture. The initial slurry can be milled, for example, in a vibratory mill. However, other milling devices may also be used to mill the initial slurry. At step 1306, a calcine process can be utilized to form a homogenous powder. The homogenous powder can be formed in the calcine process by heating the mechanical mixture in an oven at an appropriate temperature for an appropriate duration so as to cause the individual components in the mechanical mixture to chemically react and, thereby, fuse together. By way of example, the calcine process can be performed at a temperature of approximately 1150.0° C. for approximately 8.0 hours. However, the temperature and duration of the calcine process can vary depending on the particular dielectric ceramic composition that is being formed.

At step 1308, a final slurry can be formed and milled to achieve a desired particle size. The final slurry can be formed by mixing the homogeneous powder formed at step 1306 with deionized water. The final slurry can then be milled to achieve a desired particle size by using a vibratory mill or other appropriate milling device. The milling process can provide a medium particle size, for example, of approximately 2.5 microns having a particle distribution such that approximately 50.0 percent of the particles are smaller than 2.5 microns and approximately 50.0 percent of the particles are larger than 2.5 microns. The medium particle size range can be, for example, between 2.4 microns and 2.7 microns.

At step 1310, a binder can be added to the final slurry and the final slurry can be spray dried to form flowable granulates. The binder can be, for example, polyvinyl alcohol or methyl cellulose, depending on whether a dry-pressing process or an extrusion process, respectively, is utilized to shape the flowable granulates in a subsequent process step. The final slurry can be spray dried to form the flowable granulates in an appropriate spray drying process. At step 312, the flowable granulates can be forced into a desired shaped and a sintering process can be performed to form a desired dielectric ceramic composition. The flowable granulates can be formed into a desired shaped by utilizing a dry-pressing process or an extrusion process, for example. In the sintering process, the shaped granulates can be heated to a sufficiently high temperature to form a dielectric ceramic composition. By way of example, the sintering temperature range can be between 1275.0° C. and 1360.0° C. Thus, the foregoing example can achieve a wide sintering temperature range of approximately 85.0° C.

In other embodiments, between 0.0 and 8.0 percent by weight of $B_2O_3$ or CuO can be utilized as an additive to achieve a significantly lower sintering temperature. By way of example, 1.0 percent by weight of $B_2O_3$ can be added at step 1302 of the formation process to achieve a sintering temperature of approximately 1000.0° C. By way of another example, 1.0 percent by weight of CuO can be added at step 1302 of the formation process to achieve a sintering temperature of approximately 1100.0° C. Also, a dielectric ceramic composition having reduced exaggerated grain growth can be achieved. In an example embodiment, a dielectric ceramic composition having substantially no exaggerated grain growth can be achieved. Furthermore, a dielectric ceramic composition having substantially uniform electrical properties and substantially uniform density can be advantageously achieved, which can increase manufacturing yield. By way of example, a dielectric ceramic composition having a dielectric constant of approximately 20.0 can be achieved.

Thus, as described herein, a dielectric ceramic composition having a wide sintering temperature range and inhibited exaggerated grain growth can be advantageously achieved. In contrast, other dielectric ceramic compositions having Mg, Ca, and Ti typically have a narrow sintering temperature range of approximately 5.0° C. to approximately 10.0° C. with significant undesirable exaggerated grain growth. Thus, a dielectric ceramic composition having Mg, Ca, and Ti can be formed to yield a wider sintering temperature range and significantly reduced exaggerated grain growth.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio-frequency circulator comprising:
   a grounding plane having a first side that defines a recess and a second side opposite the first side;
   a magnet disposed within the recess on the first side of the grounding plane, the recess sized to receive and hold the magnet;
   a ferrite-based disk disposed adjacent the second side of the grounding plane, the ferrite-based disk having a first surface that faces toward the second side of the grounding plane and an opposite second surface that faces away from the second side of the grounding plane, the ferrite-based disk including an integral metalized layer formed on the first surface to define a grounding surface such that the metalized layer is in direct contact with the second side of the grounding plane and is interposed between the second side of the grounding plane and the first side of the ferrite-based disk; and
   a return path including a return path disk adjacent an opposite side of the magnet from the grounding plane, the return path disk having a diameter larger than the diameter of the magnet, and the return path including a hollow cylinder where the return path disk and cylinder encloses the grounding plane, the magnet, and the ferrite-based disk, the hollow cylinder having an inner diameter that generally matches the diameter of the return path disk.

2. The circulator of claim 1 wherein the ferrite-based disk has a circular shape.

3. The circulator of claim 2 wherein the ferrite-based disk includes a circular shaped ferrite disk surrounded by a dielectric ring.

4. The circulator of claim 3 wherein the ferrite disk and the dielectric ring are secured to each other substantially free of glue.

5. The circulator of claim 4 wherein the ferrite disk and the dielectric ring are formed by co-firing an assembly that includes a pre-sintered ferrite rod and an un-sintered dielectric cylinder fit around the ferrite rod.

6. The circulator of claim 1 wherein the metalized layer has a thickness that is at least 0.5 times a skin depth for a selected frequency range.

7. The circulator of claim 6 wherein the thickness is at least 1.0 times the skin depth.

8. The circulator of claim 7 wherein the thickness is at least 2.0 times the skin depth.

9. The circulator of claim 1 wherein the grounding surface has a finish so that an average value of feature sizes on the grounding surface is less than or equal to approximately 1.0 micron.

10. The circulator of claim 9 wherein the average value of feature sizes on the grounding surface is less than or equal to approximately 0.5 micron.

11. The circulator of claim 10 wherein the average value of feature sizes on the grounding surface is less than or equal to approximately 0.2 micron.

12. The circulator of claim 1 wherein the metalized layer includes a silver layer.

13. The circulator of claim 1 further comprising a center conductor disposed on the side opposite from the grounding side of the ferrite-based disk.

14. The circulator of claim 13 further comprising a second ferrite-based disk, a second magnet, and a second grounding plane configured substantially similar to and arranged as mirror images of the ferrite-based disk, the magnet, and the grounding plane about the center conductor.

15. A wireless device comprising:
    a transmitter circuit;
    a receiver circuit;
    an antenna configured to transmit signals from the transmitter circuit and to receive signals for the receiver circuit; and
    a radio-frequency circulator including a grounding plane having a first side that defines a recess and a second side opposite the first side, a magnet disposed within the recess on the first side of the grounding plane, the recess sized to receive and hold the magnet, a ferrite-based disk disposed adjacent the second side of the grounding plane, the ferrite-based disk having a first surface that faces toward the second side of the grounding plane and an opposite second surface that faces away from the second side of the grounding plane, the ferrite-based disk including an integral metalized layer formed on the first surface to define a grounding surface such that the metalized layer is in direct contact with the second side of the grounding plane and is interposed between the second side of the grounding plane and the first side of the ferrite-based disk, and the radio-frequency circulator further including a return path including a return path disk adjacent an opposite side of the magnet from the grounding plane, the return path disk having a diameter larger than the diameter of the magnet, and the return path including a hollow cylinder where the return path disk and cylinder encloses the grounding plane, the magnet, and the ferrite-based disk, the hollow cylinder having an inner diameter that generally matches the diameter of the return path disk.

16. The wireless device of claim 15 wherein the ferrite-based disk has a circular shape.

17. The wireless device of claim 16 wherein the ferrite-based disk includes a circular shaped ferrite disk surrounded by a dielectric ring.

18. The wireless device of claim 17 wherein the ferrite disk and the dielectric ring are secured to each other substantially free of glue.

19. The wireless device of claim 15 wherein the metalized layer has a thickness that is at least 0.5 times a skin depth for a selected frequency range.

20. The wireless device of claim 19 wherein the thickness is at least 1.0 times the skin depth.

21. The wireless device of claim 15 further comprising a center conductor disposed on the side opposite from the grounding side of the ferrite-based disk.

22. The wireless device of claim 15 further comprising a second ferrite-based disk, a second magnet, and a second grounding plane configured substantially similar to and arranged as mirror images of the ferrite-based disk, the magnet, and the grounding plane about the center conductor.

* * * * *